US010196040B2

(12) United States Patent
Carter et al.

(10) Patent No.: US 10,196,040 B2
(45) Date of Patent: *Feb. 5, 2019

(54) DIRECTION CROSSING DETECTOR FOR CONTAINMENT BOUNDARY

(71) Applicant: Gatekeeper Systems, Inc., Irvine, CA (US)

(72) Inventors: Scott J. Carter, Seal Beach, CA (US); James E. Chandler, Mission Viejo, CA (US)

(73) Assignee: Gatekeeper Systems, Inc., Foothill Ranch, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/842,502

(22) Filed: Dec. 14, 2017

(65) Prior Publication Data

US 2018/0118165 A1    May 3, 2018

Related U.S. Application Data

(63) Continuation of application No. 15/674,364, filed on Aug. 10, 2017, now Pat. No. 9,845,072.
(Continued)

(51) Int. Cl.
*B60R 25/30* (2013.01)
*G01V 3/08* (2006.01)
(Continued)

(52) U.S. Cl.
CPC ............ *B60R 25/30* (2013.01); *B62B 5/0423* (2013.01); *G01V 3/08* (2013.01); *G01V 3/081* (2013.01);
(Continued)

(58) Field of Classification Search
CPC .............................. B60R 25/30; B60R 5/0423
(Continued)

(56) References Cited

U.S. PATENT DOCUMENTS 5,194,844 A   3/1993 Zelda
5,831,530 A   11/1998 Lace et al.
(Continued)

FOREIGN PATENT DOCUMENTS

WO   WO 2018/031815 A1   2/2018

OTHER PUBLICATIONS

PetSafe, Deluxe In-Ground Fence Operating and Training Guide, Jan. 2004, in 24 pages.
(Continued)

*Primary Examiner* — Tai T Nguyen
(74) *Attorney, Agent, or Firm* — Knobbe, Martens, Olson & Bear, LLP

(57) ABSTRACT

A containment area can be defined by a single cable carrying an asymmetric electromagnetic signal that generates a magnetic field comprising an asymmetric waveform. A single inductor circuit configured to detect a single axis of the magnetic field can detect the asymmetric waveform and determine which direction the inductor is traveling relative to the cable. A human-propelled cart can have a wheel that includes the single inductor circuit and detect whether the cart is being pushed from inside-to-outside the containment area (which may reflect the cart is being stolen or improperly used) or from outside-to-inside (which may reflect the cart is being returned). The cart can include an anti-theft system (e.g., a locking or braking wheel), which can be triggered if the cart is being moved from inside to outside the containment area. The single cable, single inductor system can be less expensive and more efficient than multi-cable, multi-inductor systems.

21 Claims, 14 Drawing Sheets

Related U.S. Application Data

(60) Provisional application No. 62/374,677, filed on Aug. 12, 2016.

(51) Int. Cl.
 *G01V 3/38* (2006.01)
 *B62B 5/04* (2006.01)
 *G08G 1/042* (2006.01)
 *G01V 3/10* (2006.01)

(52) U.S. Cl.
 CPC .............. *G01V 3/10* (2013.01); *G01V 3/38* (2013.01); *G08G 1/042* (2013.01)

(58) Field of Classification Search
 USPC ... 340/941, 988, 10.5, 541, 552, 554, 686.1, 340/568.5, 674
 See application file for complete search history.

(56) References Cited

U.S. PATENT DOCUMENTS

| | | | |
|---|---|---|---|
| 6,127,927 A | 10/2000 | Durban et al. | |
| 6,158,392 A | 12/2000 | Andre et al. | |
| 6,271,755 B1 | 8/2001 | Prather et al. | |
| 6,362,728 B1 * | 3/2002 | Lace | B60R 25/08 188/111 |
| 6,538,617 B2 | 3/2003 | Rochelle | |
| 6,879,300 B2 | 4/2005 | Rochelle et al. | |
| 6,945,366 B2 | 9/2005 | Taba | |
| 7,656,291 B2 | 2/2010 | Rochelle et al. | |
| 7,658,247 B2 | 2/2010 | Carter | |
| 7,918,190 B2 | 4/2011 | Belcher et al. | |
| 7,944,368 B2 | 5/2011 | Carter et al. | |
| 8,046,160 B2 | 10/2011 | Carter et al. | |
| 8,047,161 B2 | 11/2011 | Moore | |
| 8,463,540 B2 | 6/2013 | Hannah et al. | |
| 8,578,984 B2 | 11/2013 | Hannah et al. | |
| 8,674,845 B2 | 3/2014 | Carter et al. | |
| 8,749,385 B2 | 6/2014 | Bernhard et al. | |
| 8,751,148 B2 | 6/2014 | Carter et al. | |
| 8,820,447 B2 | 9/2014 | Carter et al. | |
| 8,894,086 B2 | 11/2014 | Ekbote | |
| 9,205,702 B2 | 12/2015 | Hannah et al. | |
| 9,403,548 B2 | 8/2016 | Hannah et al. | |
| 9,586,606 B2 | 3/2017 | Carter et al. | |
| 9,630,639 B2 | 4/2017 | Carter et al. | |
| 9,669,659 B2 | 6/2017 | McKay et al. | |
| 9,845,072 B1 | 12/2017 | Carter et al. | |
| 2005/0279589 A1 | 12/2005 | Gray | |
| 2007/0225879 A1 | 9/2007 | French et al. | |
| 2009/0322492 A1 | 12/2009 | Hannah et al. | |
| 2010/0033338 A1 * | 2/2010 | Sverrisson | G08G 1/207 340/686.1 |
| 2010/0321185 A1 | 12/2010 | Bernhard et al. | |
| 2013/0187755 A1 | 7/2013 | Rogers et al. | |
| 2016/0093183 A1 | 3/2016 | Falkenberg et al. | |

OTHER PUBLICATIONS

PetSafe, Rechargeable In-Ground Fence Operating and Training Guide for Model No. PIG00-14673, Jan. 2014, in 36 pages.
International Search Report and Written Opinion for corresponding PCT Appl. No. PCT/US2017/046360, dated Nov. 22, 2017, in 9 pages.

* cited by examiner

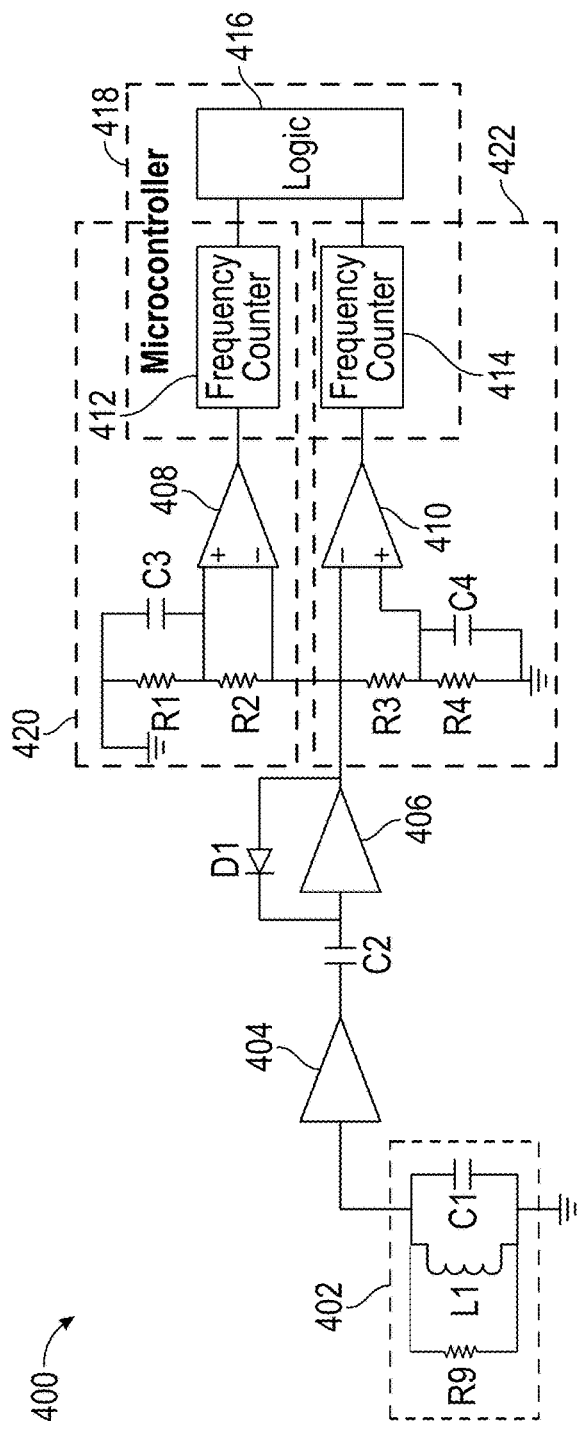
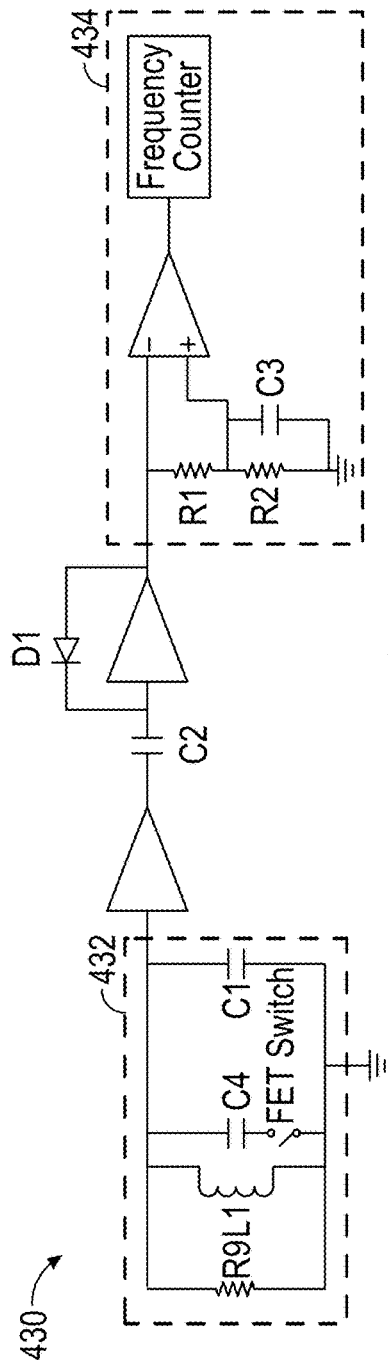
FIG. 4A
FIG. 4B

US 10,196,040 B2

DIRECTION CROSSING DETECTOR FOR CONTAINMENT BOUNDARY

INCORPORATION BY REFERENCE TO ANY PRIORITY APPLICATIONS

This application is a continuation of U.S. patent application Ser. No. 15/674,364, filed Aug. 10, 2017, to issue as U.S. Pat. No. 9,845,072 on Dec. 19, 2017, which is hereby incorporated by reference herein in its entirety. U.S. patent application Ser. No. 15/674,364 claims priority to U.S. Provisional Pat. App. No. 62/374,677, filed Aug. 12, 2016, which is hereby incorporated by reference herein in its entirety. Any and all applications for which a foreign or domestic priority claim is identified in the Application Data Sheet as filed with the present application are hereby incorporated by reference under 37 CFR 1.57.

BACKGROUND

Field

This application relates to the detection of electromagnetic fields and to the tracking, detection, or loss prevention of non-motorized, human-propelled carts, including but not limited to shopping carts.

Description of the Related Art

A variety of commercially available cart containment systems exist for deterring the theft of shopping carts from a retail store. Typically, these systems include one or more cables embedded in the pavement of a store parking lot to define an outer boundary of an area in which shopping cart use is permitted. The cables carry an electromagnetic signal that can be detected by electromagnetic sensors in the cart (typically in the wheel). If the cart is pushed across the embedded cable, the electromagnetic signal is detected, and a cart anti-theft system can be actuated (e.g., a brake in a wheel can be actuated to inhibit movement of the cart).

SUMMARY

In an illustrative, example system, a containment area can be defined by a single cable carrying an asymmetric electromagnetic signal that generates a magnetic field comprising an asymmetric, time-fluctuating waveform (typically at very low frequencies below about 9 kHz). A single inductor circuit configured to detect a single axis of the vector magnetic field can detect the asymmetric waveform and determine which direction the inductor is traveling relative to the cable. A non-motorized, human-propelled cart can have a wheel that includes the single inductor circuit and detect whether the cart is being pushed from inside-to-outside the containment area (which may reflect the cart is being stolen or improperly used) or from outside-to-inside (which may reflect the cart is being returned). The cart can include an anti-theft system (e.g., a locking or braking wheel), which can be triggered if the cart is being moved from inside to outside the containment area. The single cable, single inductor system can be less expensive and more efficient than multi-cable, multi-inductor systems.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

BRIEF DESCRIPTION OF THE DRAWINGS

FIG. 4A shows an overall block diagram of an example of a single inductor direction-detector receiver to detect a VLF signal from the buried cable.

FIG. 4B is a block diagram of a single inductor direction-detector receiver that is another version of the receiver shown in FIG. 4A.

Unless the context indicates otherwise, like reference numerals refer to like elements in the drawings. The drawings are provided to illustrate embodiments of the disclosure described herein and not to limit the scope thereof.

DETAILED DESCRIPTION

Overview

Many shopping cart containment systems, such as the CartControl® containment system from Gatekeeper Systems Inc. (Irvine, Calif.), make use of a buried cable transmitting antenna to mark the boundary of the region in which the shopping cart must be contained. If the cart crosses the boundary (e.g., passes above the buried cable), an electronic apparatus in the shopping cart wheel decodes a modulated very low frequency (VLF, e.g., 8 kHz) radio frequency (RF) carrier which is present on the cable and activates a mechanism that inhibits the cart's motion (e.g., by braking, locking, or inhibiting rotation of a wheel of the cart). Embodiments of such electronic apparatus are described in U.S. Pat. No. 6,127,927, Anti-theft Vehicle System, which is hereby incorporated by reference herein in its entirety.

At the system level, it may be desirable to be able to detect in which direction a cart is crossing the containment boundary: from inside to outside (outgoing) or from outside to inside (incoming). An inside to outside crossing typically calls for activating the motion-inhibition mechanism (e.g., the cart is being stolen or moved into an unauthorized area); an incoming crossing (e.g. a locked cart being dragged back across the boundary into an authorized area) typically calls for releasing the motion-inhibition mechanism, so that the cart can again be used normally.

If the cart cannot detect the direction in which it is crossing the buried cable, one possible solution is to use two nested buried cables, e.g., the outer cable broadcasting "lock" and the inner cable broadcasting "unlock". Thus a cart crossing first the "lock" cable and then then "unlock" cable knows that it is moving inward across the containment boundary and can unlock. However, this solution requires installation of two separate cables, which may increase expense and complexity of certain such systems.

Figure 1:
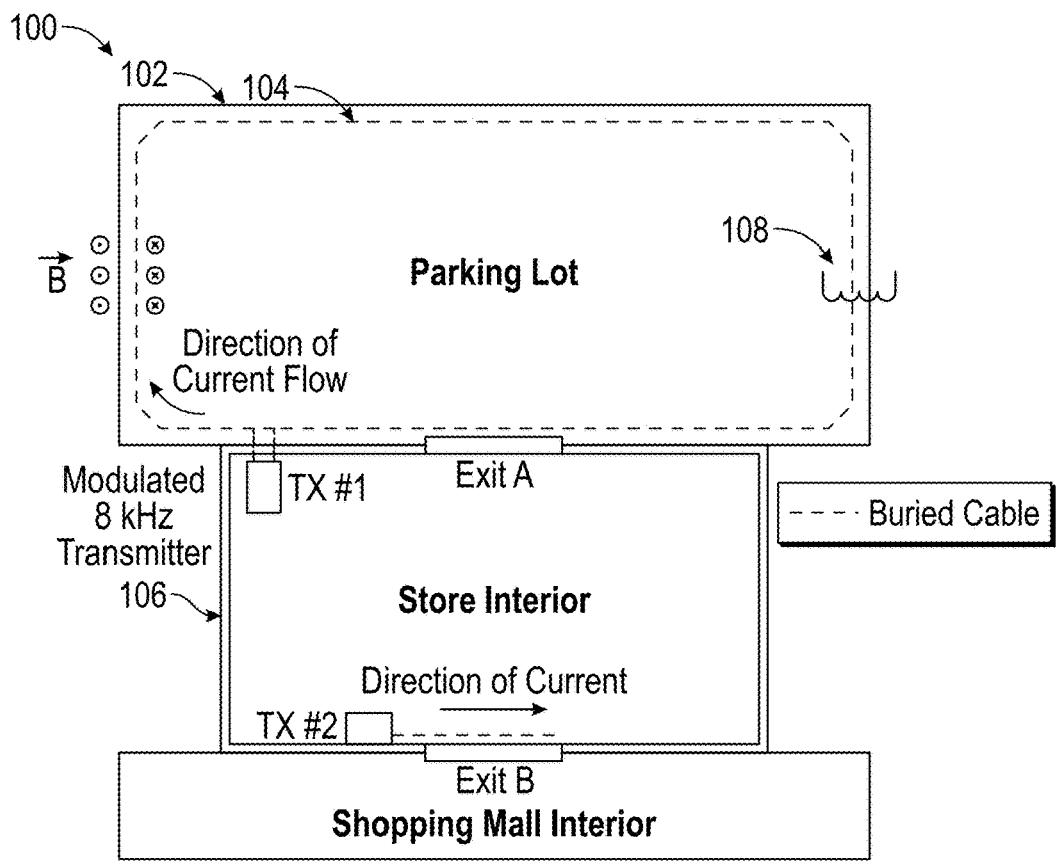
FIG. 1 schematically illustrates an example of a retail installation of a cart containment system.

FIG. 1 schematically illustrates an example of a retail installation of a cart containment system 100. FIG. 1 includes a parking lot 102, a buried cable 104 (illustrated by dashed line lines), a store 106 having Exit A and Exit B, a first transmitter TX#1, and a second transmitter TX#2. A current through the buried cable causes a magnetic field $\vec{B}$ to be generated. An induction circuit 108 can move over the buried cable 104 in or out of the parking lot 102. As described below, the induction circuit can be configured to measure a single component of the vector magnetic field $\vec{B}$ generated by the current in the buried cable. The induction circuit may comprise only a single inductor having an axis along which the component of $\vec{B}$ is measured. Also as further described below, such single induction circuit embodiments can be advantageous compared to dual induction circuit embodiments configured to measure two components of the vector magnetic field $\vec{B}$ (typically components along two orthogonal directions).

The buried cable 104 forms a loop, with an area inside the loop. The buried cables carry a VLF (typically less than 9 kHz) electromagnetic signal. The electromagnetic signal can encode a motion-inhibition instruction that can trigger a motion-inhibition system in the carts (e.g., by locking, braking, or inhibiting rotation of one or more cart wheels). In this particular example, there are two exits from a store. Exit A leads to a parking lot, and Exit B leads to an interior area of a multi-store shopping mall. A desired system behavior may be that shopping carts leaving the store through Exit A are free to roam the parking lot, but their motion will be inhibited if the person pushing the cart attempts to take the cart out of the boundary of the parking lot (where a VLF cable is buried). Similarly in this example, the shopping carts are for the use of patrons of the store only, not for use elsewhere in the shopping mall, so carts that attempt to cross the buried cable just inside Exit B will also have their motion inhibited. The return loop of the buried cable at Exit B may be out of the plane of the floor (e.g. the cable return may be routed through the frame of Exit B).

In this example, there are two separate VLF (e.g., 8 kHz) transmitters, one for each loop of cable (e.g., TX #1 and TX #2). Each transmitter can be configured to transmit a VLF signal across a burred wire. In some embodiments, one VLF transmitter can transmit VLF signals through multiple loops of cables. A receiver in a cart can detect the VLF signal to determine the cart's proximity to the buried cable 104.

As the VLF transmitter TX #1 transmits a VLF signal through the buried cable 104, a current is driven through the buried cable 104 in the clockwise direction as shown in FIG. 1. According to the right hand rule for current carrying wires, the current through the buried cable 104 generates the magnetic field $\vec{B}$ around the buried cable 104 in the directions shown in FIG. 1. In some embodiments, the cable currents can be kept under 1 ampere root-mean-square (RMS), under 200 mA RMS, about 120 mA RMS, under 100 mA RMS, or other value, or the induced magnetic field can couple into ferromagnetic structures (e.g., buried cast iron pipes or electrical conduits) and cause poor or unreliable system performance.

Further details regarding cart containment systems (that are usable with embodiments of the present disclosure) are described in U.S. Pat. No. 8,463,540, which is hereby incorporated by reference herein in its entirety for all it discloses.

Additionally, although examples described herein are in the context of shopping carts in a retail environment, this is for purpose of illustration and is not intended to be limiting. The disclosed embodiments can be used in other contexts where containment of wheeled carts to an authorized area is desired such as, e.g., warehouses and warehouse carts, transportation depots (e.g., airports, train stations, bus stations, etc.) and luggage carts or baggage carts, medical facilities (e.g., hospitals, doctors offices, nursing homes, convalescent or treatment centers, etc.) and wheelchairs, hospital bends, medical device carts. Carts include any type of non-motorized, human-propelled cart. Such carts can be equipped with motion-inhibition systems, which may take the form of a brake, lock, or device to inhibit wheel rotation associated with one or more cart wheels. For example, a cart wheel can include an embodiment of the wheel brake described in U.S. Pat. No. 8,463,540. The motion-inhibition system may communicate electromagnetically with the buried cable (e.g., wirelessly, to receive a VLF signal from a cable).

Example Cart Containment Implementations

A low power consumption 8 kHz receiver suitable for receiving and decoding the VLF signals of a lock line can be found in a SmartWheel® cart wheel available from Gatekeeper Systems, Inc. (Irvine, Calif.). This receiver uses an inductor as both its antenna and as the inductive element of the receiver's resonant tank circuit, which can be tuned to detect the frequency of the VLF signal propagating in the buried cable 104.

Determining which direction a cart is moving relative to a cable is straightforward to solve given two inductors, with axes mounted at 90 degrees to each other, where the angle of each inductor to the horizontal is known. The angle can be known either by mechanical constraint, or by including an angle sensor such as a microelectromechanical systems (MEMS) accelerometer which co-rotates with the inductors. An example of a two inductor solution to the problem can be found in U.S. Pat. No. 8,749,385 to Bernhard, et al. That patent refers to "magnetic field sensors" and an "AC magnetic field" without using the word "inductor".

The inductor used to form an appropriate VLF antenna may be relatively bulky (e.g., 7 mm diameter by 12 mm length), and a dual inductor receiver may require substantial redesign of the wheel's internal mechanical components (e.g., to fit the line crossing detector, RF transceivers, wheel brakes, and other components inside the wheel), especially if two inductors are aligned on two different axes.

Various circuits and devices other than inductors can detect alternating current (AC) magnetic fields in the kHz range. For example, magnetoresistive (MR) sensors from such suppliers as Sensitec (Mainz, Germany) can detect time-varying (e.g., kHz) magnetic fields and may be used in certain embodiments of the circuits described herein. But size, cost, and power budget considerations tend to make inductors the preferred magnetic field sensor for applications such as VLF reception in shopping cart wheels.

In particular, to prolong battery life, an active idle current for the entire receiver circuit (e.g., when the receiver circuit is not being excited by the nearby presence of the buried cable) can be on the order of 12 microamps or less, and a current when the receiver circuit is being excited by the VLF field can be on the order of 50 microamps or less (in both example cases the power supply to the receiver is assumed to be the voltage of a single cell lithium battery, e.g., no more than about 3 volts depending on the battery chemistry). This level of idle current is difficult to achieve with MR sensors.

It may be desirable to be able to detect a line crossing using a single inductor. For example, it can be desirable to determine whether a moving cart is exiting or entering a perimeter without the expense of burying a second cable around the perimeter, without the expense of mounting a second inductor in a wheel, without having component area internal to the wheel occupied by the second inductor, or without having power consumed by the second inductor. In some embodiments disclosed herein, the direction of a moving cart (e.g., entering or exiting) can be detected for a perimeter having one buried cable using a detection system that includes one magnetic field sensor (e.g., one inductor aligned on a first axis) without including a second sensor (e.g., without a second inductor aligned on a second axis different from the first axis).

Also, embodiments of a single inductor receiver as described herein have a somewhat lower manufacturing cost for multiple reasons (e.g., fewer components with lower component cost, and also fewer specialized manufacturing operations, since the receiver inductor may be a through hole part which requires hand soldering and mechanical support and use of a single inductor, rather than two inductors, reduces the amount of hand soldering or mechanical support needed).

Examples of qualities of an inductor that may be beneficial to a single inductor VLF detection crossing detector include one or more of the following. (1) The inductor should have sufficient inductance to generate a reliably detectable voltage (EMF) in response to otherwise acceptable magnetic field strengths induced by the VLF signal from the buried cable 104. A typical usable inductance value is on the order of a few millihenries (mH) to tens of millihenries (e.g., 1 mH to 50 mH). Higher EMFs associated with larger inductances generally improve the sensitivity and signal-to-noise (SNR) of the receiver, which must be balanced against the larger size and greater cost of the larger inductor. (2) The inductor should have mechanical stability and durability against shocks. In the case of a shopping cart wheel, shocks in excess of 2000 g (where g is the Earth's gravitational acceleration) are not especially uncommon. Some inductor materials can last longer than others. For example, ferrite core inductors generally cannot repeatedly tolerate that sort of shock level for prolonged periods of time. (3) The inductor should have smaller changes in inductance as a result of mechanical vibration in either the VLF passband (less than 9 kHz, e.g., 8 kHz) or the modulating frequency (typically a few hundred Hz) of the VLF cable signal. Shopping cart wheels also sometimes vibrate while rolling (e.g., over rough parking lot surfaces) and changes in the inductance due to the vibration of the shopping cart can cause spurious signals at the receiver. The foregoing are several desirable qualities of an inductor but are not intended to be requirements for any particular inductor.

Example Fluctuating Magnetic Field Sensors

Magnetic field sensors include inductors, magnetoresistive sensors, and other circuits configured to be responsive to a fluctuating (e.g., time-varying) magnetic field in a particular direction. In some examples, such a time-varying magnetic field may be referred to as an AC magnetic field, because such time-varying magnetic fields are commonly generated by AC circuits. However, this is for illustration, and an AC magnetic field may refer to the fluctuating magnetic field generated by a DC current that includes a fluctuating part (e.g., a fluctuating current plus a larger DC offset). As is clear from Faraday's law, the EMF generated in an inductor is related to the time-varying magnetic flux, and a DC offset current (if used) will not generate an EMF (or will generate an EMF very much smaller than due to the time-varying component at typically kHz frequencies). As an example, an inductor can comprise a coil of wire around a core that is sensitive to the component of the magnetic field that is parallel to the coil axis. The term inductor, as used herein, is intended to refer to an inductive element having inductance as the primary property for which the element is used. For example, a wire may have an undesirable parasitic inductance, but if the wire is used primarily to conduct electricity, then wire's primary property is conductivity, and the wire is not considered an inductor.

As described herein, embodiments of the direction detection circuits are referred to, for simplicity, as single inductor circuits, because the direction detection capability of the circuit is provided by an AC magnetic sensor that is configured to measure a single component of the vector AC magnetic field generated by an RF-frequency electromagnetic current in the cable 104 (e.g., a component of the vector AC magnetic field along a single axis). Such embodiments are simpler than two-inductor direction detection circuits, which typically use two distinct inductors (often disposed at right angles to each other) to measure two separate components of the vector AC magnetic field.

The words single inductor are intended to refer to an induction circuit configured to measure a single component of the vector AC magnetic field along a single axis in space. Such a single inductor often is just a single, unitary inductor. However, in other implementations, such a single inductor can comprise two or more inductors in series or in parallel that are configured to measure a single component of the magnetic field along a single axis in space. For example, two inductors electrically connected in series and disposed along a single axis are the electrical equivalent of a single inductor disposed along the single axis having a single inductance that is the sum of the inductance of the two inductors, and these two inductors function as a single inductor if substituted for the one inductor. As another example, two inductors electrically connected in parallel and disposed along a single axis (or parallel to the single axis) are the electrical equivalent of a single inductor having a single inductance that is the reciprocal of the sum of the reciprocal of each inductance of the two inductors, and these two inductors function as a single inductor if substituted for the one inductor.

Example Operation of a Single Inductor Circuit for Direction Detection

In the example implementation shown in FIG. 1, the current in the buried cable 104 surrounding the parking lot flows in a clockwise direction. As further described below, in various implementations, the current may be a direct current (DC) that includes a DC offset plus a fluctuating current component (e.g., time-varying at VLF frequencies) that generates a fluctuating magnetic field. Thus by the right hand rule, the horizontal component of the magnetic field $\vec{B}$ above the buried cable points inward, toward the parking lot, where cart motion is authorized. In other embodiments, the current may be an alternating current (AC).

The EMF, V, induced in an inductor with inductance L is the inductance multiplied by the rate of change of the current I as expressed by V=L(dI/dt). An inductor 108 with a horizontal axis which is passing over the buried cable will produce an EMF of the same sign as dI/dt in the cable (where I is the cable current), if the measured end of the inductor is pointing inward, and the EMF will be of the opposite sign as dI/dt if the inductor is pointing outward.

In practice and as further described below with reference to FIG. 2, because the desired detection point of a cart moving outward may be at a position before the cart wheel passes directly over the cable, the inductor axis can be angled at an angle θ relative to the vertical to align the axis of the inductor with the magnetic field vector at that position. Aligning the inductor so that it is substantially parallel to the magnetic field vector $\vec{B}$ (at the desired detection point) improves the sensitivity of the detection circuit because the single component of the magnetic field detected by the inductor is approximately equal to the full magnitude of magnetic field.

Figure 2:
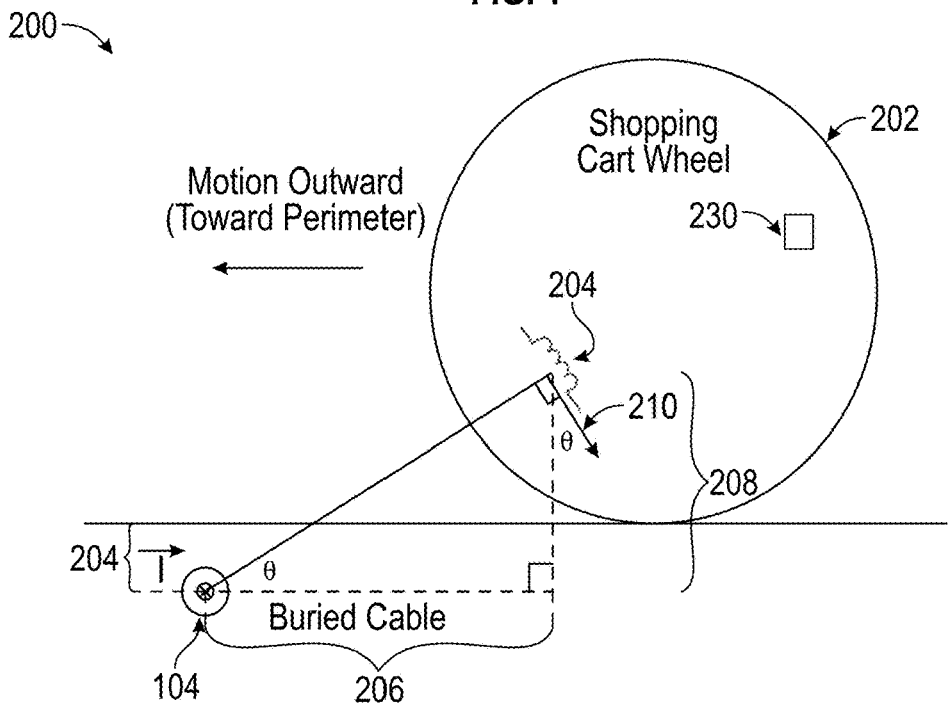
FIG. 2 schematically shows an example of a system including a shopping cart wheel moving outward toward the buried cable, prior to passing over the buried cable.

FIG. 2 schematically shows a system 200 including a shopping cart wheel 202 moving outward toward the buried cable, prior to passing over the buried cable 104. An inductor 204 is included inside the wheel and disposed toward the leading edge of the wheel (e.g., the side of the wheel in the direction of motion of the cart). The wheel 202 can be configured such that the inductor 204 does not rotate with the rotation of the wheel, for example, by attaching the inductor to a chassis or circuit board that is rigidly attached to a non-rotating axle as described in, e.g., U.S. Pat. No. 8,820,447, which is hereby incorporated by reference herein in its entirety. The wheel 202 can include an angle detection device 230, which will be described below.

The buried cable can be buried by a first vertical distance 204 below a surface. The first vertical distance is typically one to a few cm. At the desired detection point, the inductor 204 can be a horizontal distance 206 away from the buried cable 104 and a second vertical distance 208 above the buried cable 104.

In this example, the cable current I is into the page so that directly over the buried cable 104, the horizontal magnetic field component above the buried cable 104 points to the right (opposite the arrow showing the outward motion of the wheel 202). As can be seen from FIG. 2, the magnetic field vector $\vec{B}$ at the position of the wheel is angled downward as shown by arrow 210 (according to the right hand rule). Accordingly, as explained above, an inductor axis that is aligned at the angle θ relative to vertical will more closely align the detection axis of the inductor with the cable's magnetic field. The angle θ can be determined from the formula tangent θ equals the vertical distance 208 divided by the horizontal distance 206.

The detection point can be selected so that the horizontal distance 206 is close enough to the cable 104 such that the VLF signal has enough power to reach the inductor to cause a reliably measureable EMF and also be far enough to provide advance notice of a cart exiting a perimeter such that a cart anti-theft system (e.g., a wheel braking system) has time to respond and activate to inhibit motion of the cart. In some embodiments, the horizontal distance 206 can be about 0.25 meters, 0.5 meters, 1 meter, 1.5 meters, 2 meters, etc. In some embodiments, the buried cable 104 is positioned at a distance 204 of about 1-3 centimeters below the surface, and the inductor is positioned a few centimeters above the bottom of the wheel. Accordingly, in various embodiments, the angle θ is in a range from 0 degrees to about 45 degrees, 2 degrees to 30 degrees, or 5 degrees to 20 degrees.

In other implementations, the desired detection point might be right over the buried cable 104 (e.g., the desired horizontal detection distance 206 is close to zero), and the magnetic field direction is substantially horizontal. In such implementations, the inductor 204 may be disposed in the wheel so that its detection axis is also substantially horizontal, e.g., the angle θ is approximately 90 degrees. Accordingly, in various such embodiments, the angle θ is in a range from 75 degrees to 125 degrees or 80 degrees to 110 degrees.

The buried cable 104 can carry a modulated signal that is encoded such that a positive slope of the current as a function of time (e.g., dI/dt) has a different magnitude than a negative slope, dI/dt. It is possible to determine which direction the wheel 202 is crossing the buried cable 104 by determining which direction of the EMF induced in the inductor has a greater absolute magnitude. Thus, the signal modulated on the cable can be asymmetric under inversion and phase shifting (see, e.g., the example waveforms described with reference to FIG. 3A, 3B, and FIG. 6). Note that in many implementations, the current in the cable can be positive or zero, such that the magnetic field points in a constant direction. Accordingly, the waveform can have a direct current (DC) offset such that, when superimposed with an AC signal, the voltage (or current) can remain positive with respect to local ground. Such embodiments may simplify the transmitting amplifier design, because a bipolar power supply is not needed. Further, the impedance of the cable may be almost entirely reactive at VLF frequencies, so power expended transmitting the DC component in the cable is relatively small. In various implementations, a DC offset is used for shorter cables (e.g., for containment boundaries in entrances/exits), whereas an AC signal (e.g., generated with a bipolar push-pull amplifier) may be used for longer cables around a parking lot.

An example proposed single inductor direction detection circuit (described in detail below) provides a capability to determine the direction that the inductor (e.g., in the wheel) crosses the cable. The single inductor can be arranged along a single axis and configured to measure the magnetic field along that single axis. As described above, some embodiments feature one or more inductors on only one axis to detect the waveform in a buried cable 104. Some embodiments can include inductors for other circuit functions (e.g., other than for detecting the waveform in the buried cable 104).

A suitable waveform on the cable 104 can comprise a phased overlay of two frequencies in a 2:1 ratio, a 3:2 ratio, or any other ratio. In some embodiments, the 3:2 ratio is preferable, since the quality factor Q of a receiver tank circuit can be somewhat higher (and thus the sensitivity greater) with the signals being only half an octave apart, even though the decoding may be slightly more complex. Further, the bandwidth of a receiver configured to detect 3:2 ratios is less than the bandwidth of a receiver configured to detect 2:1 ratios. In addition, ratios (such as 3:2) that keep the transmitted electromagnetic signal (including the waveforms described herein) below 9 kHz (e.g., in the portion of the frequency spectrum unregulated by governmental agencies such as the Federal Communications Commission) can be advantageous. Other embodiments can feature frequencies having any other ratio, such as 5:7, 3:4, 3:5, 4:5, etc.

Example Single Inductor Direction Detection Waveforms

Figure 3A:
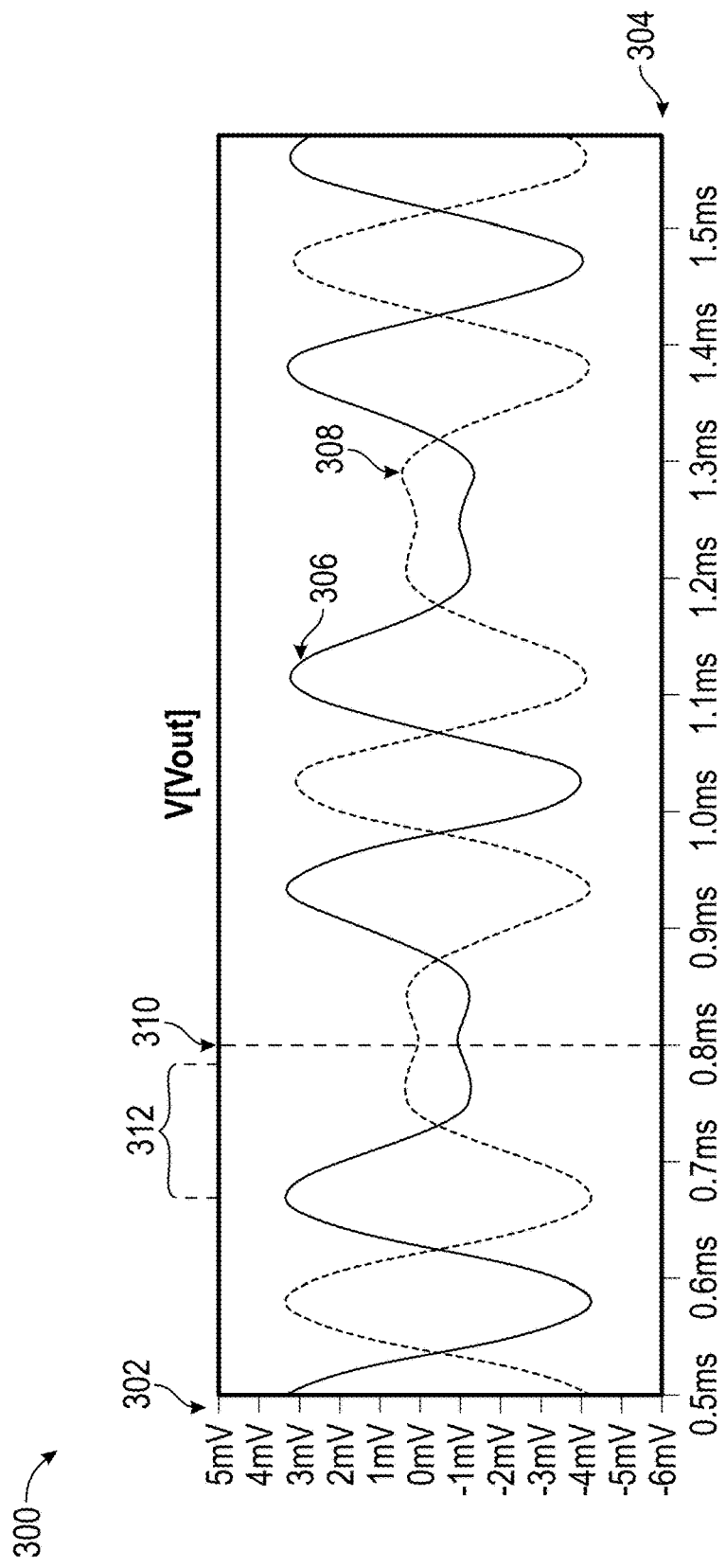
FIG. 3A is a graph of an example waveform that can be driven through a buried cable.

FIG. 3A is a graph 300 of an example waveform 306 that can be driven through a buried cable. The y-axis 302 indicates a voltage in mV, and an x-axis 304 indicates time in ms. The graph includes an example waveform 306 and a second example waveform 308. The waveforms 306, 308 can be an asymmetric component as described below.

The example waveform 306 can is the sum of two sine waves, at 8 kHz and ⅔*8 kHz, e.g., with frequencies having a ratio of 3:2:

$$\sin(2\pi(\tfrac{2}{3}*8e03)t+\pi/4)+0.6\sin(2\pi*8e03*t)$$

Figure 3B:
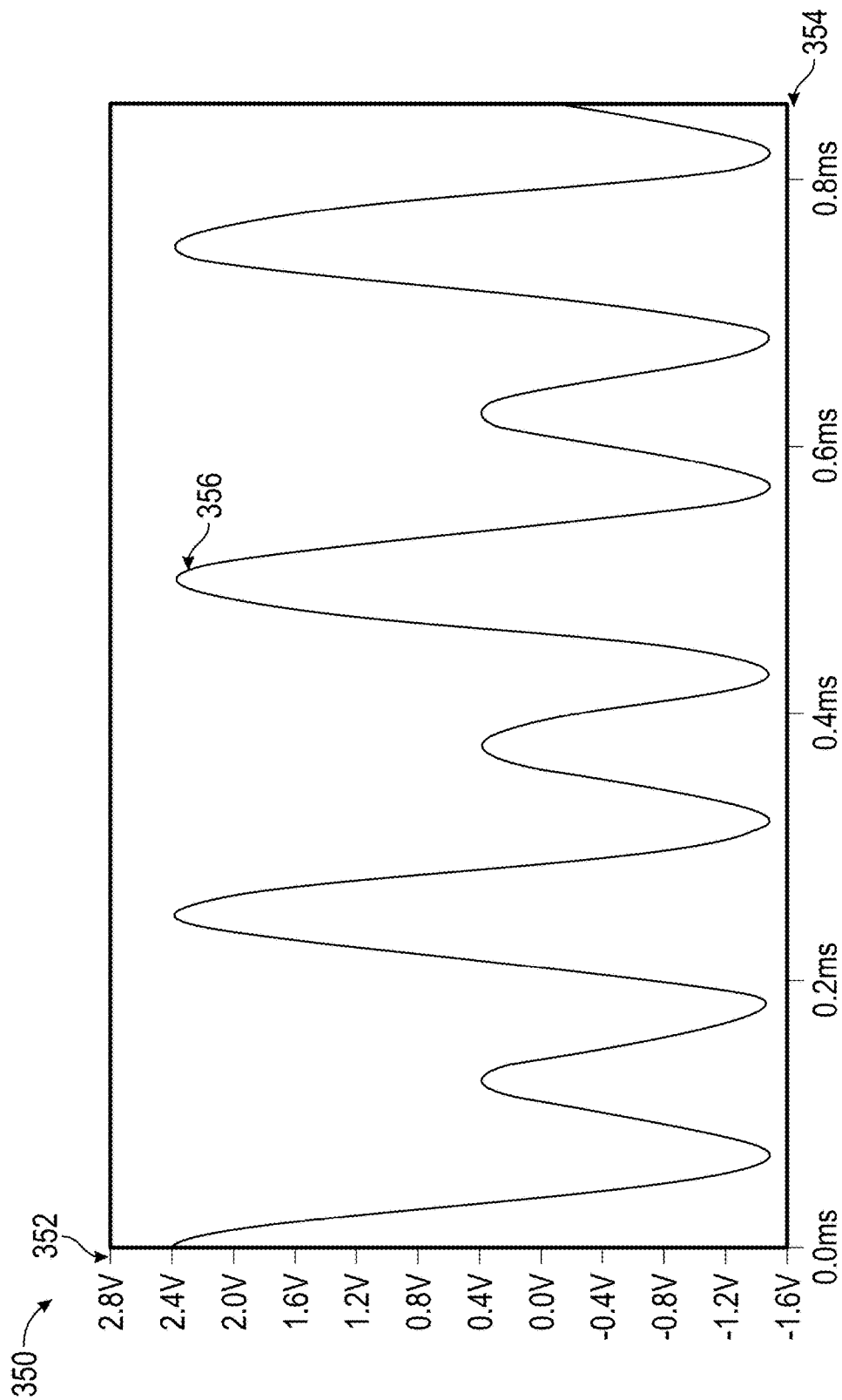
FIG. 3B is a graph that shows an example waveform that is the sum of two sine waves one octave apart.
Figure 6:
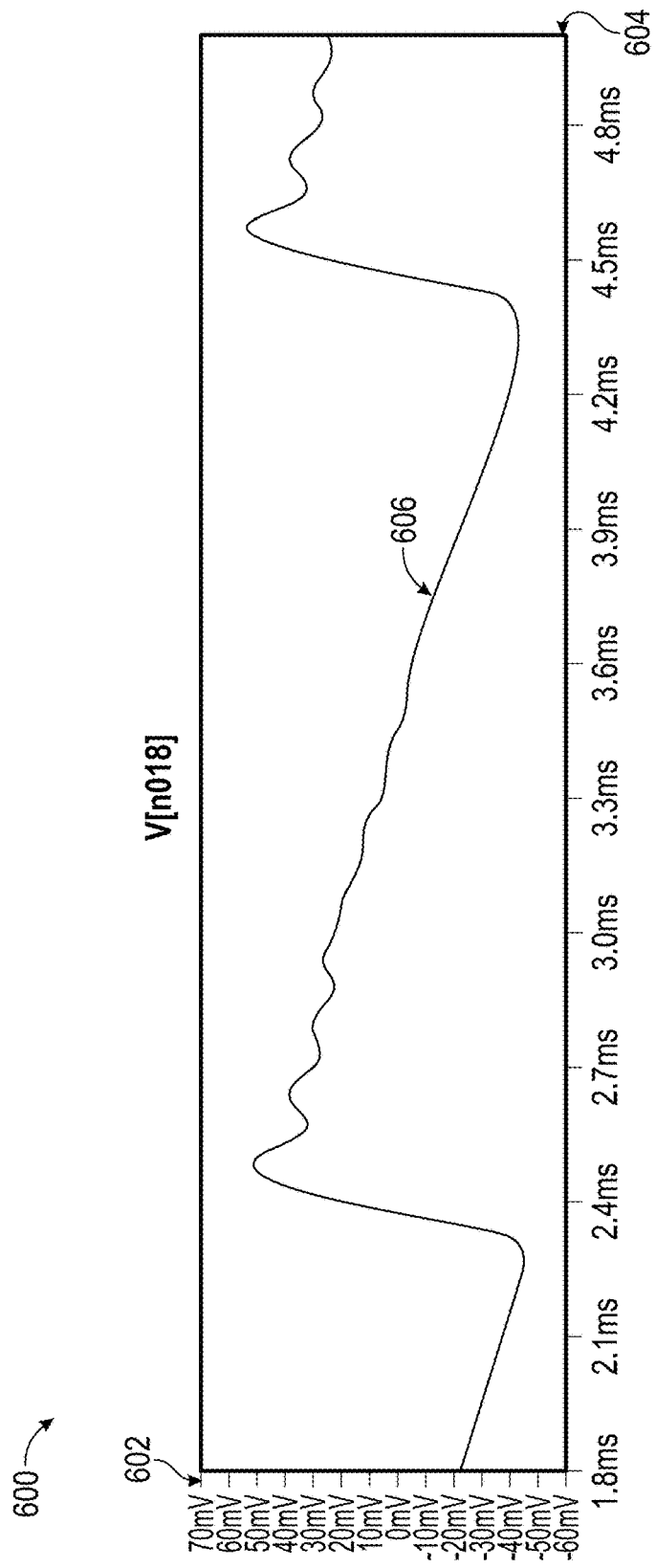
FIG. 6 is a graph that shows an example of a 500 Hz saw tooth waveform.

The second waveform 308 is an inverted version of the first waveform 306, e.g., the voltage V(waveform 308)=−V (waveform 306). Because the waveform 306 comprises a plurality of sinusoidal frequencies (in this example, two with a 3:2 ratio), the waveform 308 cannot be inverted and phase-shifted (by any amount) to become a replica of the waveform 306. Accordingly, the example waveform 306 is asymmetric in time. For example, the waveform 306 and the second waveform 308 have different sequences of local maxima and minima such that, even if the waveform 308 is phase shifted and inverted (or proportionally scaled in voltage if the amplitudes were different), the phase shifted, inverted, and scaled waveform 308 will be distinct from the waveform 306. An inductor in a wheel that is approaching the buried cable from a first direction (say, from inside the parking lot) will measure one of the waveforms 306, 308, whereas the inductor will measure the other of the two waveforms 308, 306 when approaching the buried cable from a second direction (opposite to the first directions, say, from outside the parking lot). This occurs because the measured end of the inductor points 180 degrees differently in these two scenarios. Accordingly, by broadcasting a signal comprising an asymmetric waveform (such as shown in FIG. 3A or FIGS. 3B and 6 described below) on the buried cable 104, a single inductor configured to measure the magnetic field along a single direction can determine along which of the first or second direction it is approaching the cable. Thus, the single inductor circuits described herein can determine direction relative to a cable that generates a signal comprising an asymmetric waveform.

The reference point shown by dashed line 310 indicates an example feature of the waveforms that can be used to determine which waveform is detected. For example, at 0.8 ms, the waveform 306 has a local voltage maximum surrounded on either side by a local voltage minimum. In contrast, the waveform 308 has a local voltage minimum surrounded on either side by a local voltage maximum. These features can be detected and distinguished, and the direction of the cart can be determined. As described below, other features of the waveform can be used as well, for example, the relative location of peaks, valleys, positive slopes, or negative slopes. As one example, the waveform 306 has a large magnitude voltage maximum at about 0.66 ms followed by a negative slope prior to the local peak at 0.8 ms.

Waveform features over a time period 312 can additionally or alternatively be used to distinguish the waveforms. The time period 312 can be a fraction of the period of the waveform. For example, the reference point shown by dotted line 310 can be preceded by a voltage maximum that decreases (e.g., has negative slope) and would indicate that waveform 306 is detected or can be preceded by a voltage minimum that increases (e.g., has positive slope) and indicate that the second waveform 308 is detected. Accordingly, the direction of the cart can be determined based on which waveform, 306 or 308 is detected by the single detection axis inductor 204.

FIG. 3B is a graph that shows another example waveform 356 that is the sum of two sine waves one octave apart. The ratio of frequencies in this example is 2:1 at 8 kHz and 4 kHz:

$$\sin(2\pi*4e03*t+\pi/4)+1.4\sin(2\pi*8e03*t)$$

The waveform 356 provides another example of waveform features that can be detected by an inductor and will appear different based on the direction of movement of the inductor. An inductor moving in one direction can detect the waveform 356 (e.g., with local maxima around 0.4V) while an inductor moving in the opposite direction will detect an inverted version of the waveform 356 (e.g., with local minima around −0.4V).

Example Single Inductor Direction Detection Circuits

FIG. 4A shows an overall block diagram of an example of a single inductor direction-detector receiver 400 to detect the VLF signal from the buried cable 104. The receiver 400 includes a receiver tank circuit 402 that includes inductor L1 and capacitor C1, with inductance and capacitance chosen so that the resonant frequency of the tank circuit 402 matches the frequency of the signal in the cable 104 (e.g., 8 kHz). The resonant frequency of the tank circuit can be $1/(2\pi\sqrt{L1C1})$. The receiver also includes a receiver input amplifier 404, a capacitor C2, a diode D1, a second receiver amplifier 406, a first waveform feature identifier circuit 420, a second waveform feature identifier circuit 422, and detection logic 416. The first waveform feature identifier circuit 420 can include resistor R1, resistor R2, capacitor C3, comparator 408, and frequency counter 412. The second waveform feature identifier circuit 422 can include a resistor R3, resistor R4, capacitor C4, comparator 410, and frequency counter 414. In some embodiments, some functionality can be implemented by a digital circuit such as a microcontroller 418.

The receiver tank circuit 402 can include the capacitor C1 and the single inductor L1 configured to measure the AC magnetic field along a single axis. The single inductor L1 can be disposed in the wheel 202 like the inductor 204 described with reference to FIG. 2. The inductor L1 can generate a voltage that is input to the receive input amplifier 404 as a result of the time varying magnetic field generated by a transmit antenna (e.g., the buried cable 104). In some embodiments, the single inductor L1 can be the only inductor used to detect the VLF signal from the buried cable 104. In some embodiments, the single inductor L1 is arranged along one axis without a second inductor arranged along a different axis (e.g., at right angles to the first axis) for detecting the VLF signal.

The receive input amplifier 404 boosts the input waveform and provides a boosted waveform. An output of the receive input amplifier 404 is AC coupled to a second receive amplifier 406, where the boosted waveform is further amplified. The second receive amplifier 406 provides an amplified waveform. The positive edge of the amplified waveform is clamped by capacitor C2 and diode D1.

In the example shown in FIG. 4A, the amplified waveform is fed to the waveform feature identifier circuits 420 and 422. In various embodiments, the amplified waveform can be fed to a single feature identifier circuit (e.g., the circuit 420, with the circuit 422 not used) or to a plurality of greater than two feature identifier circuits. Each feature identifier circuit can have different component values (resistor and capacitor values) and be configured to detect different waveform features, operate under different noise conditions, detect different features in frequencies, or operate with different sensitivity levels. In some embodiments, the different feature identifier circuits can have different circuit layouts. A logic controller can determine, based on the outputs of the waveform feature identifier circuits, which direction a cart is moving relative to the buried cable that is generating the time varying magnetic field. In the example shown in FIG. 4A, the amplified waveform is fed to two feature identifier circuits that have similar layouts and different component values.

In a first feature identifier circuit 420, the amplified waveform is fed to a comparator 408. The comparator 408 is set to trip at a voltage below the positive edge of the amplified waveform, the voltage being set by resistors R1 and R2. Capacitor C3 holds the inverting input of the comparator 408 at the average voltage seen at the junction of resistors R1 and R2. A frequency counter 412 can count or determine timings of how frequently the output of comparator 408 changes.

In the receiver 400 shown in FIG. 4A, the amplified waveform from a second feature identifier circuit 422 is fed to a second comparator 410. The comparator 410 is set to trip at a voltage below the positive edge of the amplified waveform, the voltage being set by resistors R3 and R4. Capacitor C4 holds the inverting input of the comparator 410 at the average voltage seen at the junction of resistors R3 and R4. A frequency counter 414 can count or determine the timings of how frequently the output of comparator 410 changes.

A logic controller 416 can, based on the outputs of the frequency counters, determine whether a cart is moving in one direction or another. For example, based on the waveform shown in FIG. 3A, the frequency or timings of the waveform features (such as maxima or minima, or whether voltages (or currents) pass certain thresholds or have slopes that pass certain thresholds) can be detected in order to distinguish, for example, the waveform 306 from the waveform 308 and thus to determine the relative direction of the wheel (and the cart) to the buried cable. The logic controller 416 can comprise a digital signal processor (DSP), hardware microprocessor, programmable logic device (PLD), application-specific integrated circuit (ASIC), or other type of hardware logic circuitry.

FIG. 4B is a block diagram of another embodiment of a single inductor direction-detector receiver 430 that shares similar features to the receiver 400 shown in FIG. 4A. In FIG. 4B, the receiver tank circuit 432 includes a single inductor L1, capacitors C4 and C1, and a field effect transistor (FET) switch. The receiver 430 also includes one waveform feature identifier circuit 434 having a comparator similar to the comparators 408, 410 in FIG. 4A.

The center frequency of the resonant receive tank circuit 432 is lowered by a factor f when the FET switch is closed, because the capacitance of the tank 432 becomes C1+C4 rather than C1. This allows upper and lower frequency components of the received waveform to be equally spaced (in ratio) above and below the resonant frequency of the tank circuit. This circuit design may reduce or minimize phase shift variations due to tank circuit component variations. For a case where the frequencies in the waveform are in a 3:2 ratio, the factor f can be $1/\sqrt{2/3}$, which can be achieved when C4=C1/2. For cases where the frequencies in the waveform are in a 2:1 ratio, the factor f can be $1/\sqrt{2}$, which can be achieved when C4=C1. For implementations using an asymmetric waveform with a first frequency at the VLF frequency and a second frequency at a fraction (e.g., ½, ⅔, etc.) of the VLF frequency, the FET can be configured to pull down the frequency by a factor equal to the square root of this fraction (e.g., so that this frequency is the geometric mean of the two signal frequencies).

In some installations (e.g., retail stores), there may be a mix of signal transmitters with some transmitters transmitting a direction-crossing sensitive asymmetric signal (e.g., at a parking lot perimeter) and some transmitters (which may be less complicated and thereby less expensive) transmitting non-direction-crossing sensitive signals (e.g., at beacons used in a cart containment system). Thus, there can be an advantage in providing a wheel receiver which is able to be programmed to work with both types of transmitters. Thus, as described with reference to FIG. 4B, the capacitor C4 and the FET switch provides the receiver 430 with selectable program modes, with a first mode that is backward compatible with legacy non-direction-crossing sensitive transmitters (e.g., having a center frequency at 8 kHz and low fractional bandwidth) and with a second mode that is compatible with the direction-crossing-sensitive asymmetric signals (e.g., with a center frequency at a geometric mean of high and low signaling frequencies and more fractional bandwidth). In other embodiments (e.g., the receiver 400 of FIG. 4A), the FET switch is not used (e.g., because selectable program modes are not needed or backward compatibility with legacy systems is not needed), and the value of C1 in the receiver 400 can be selected to be equal to the value of C1+C4 in the receiver 430.

Figure 4C:
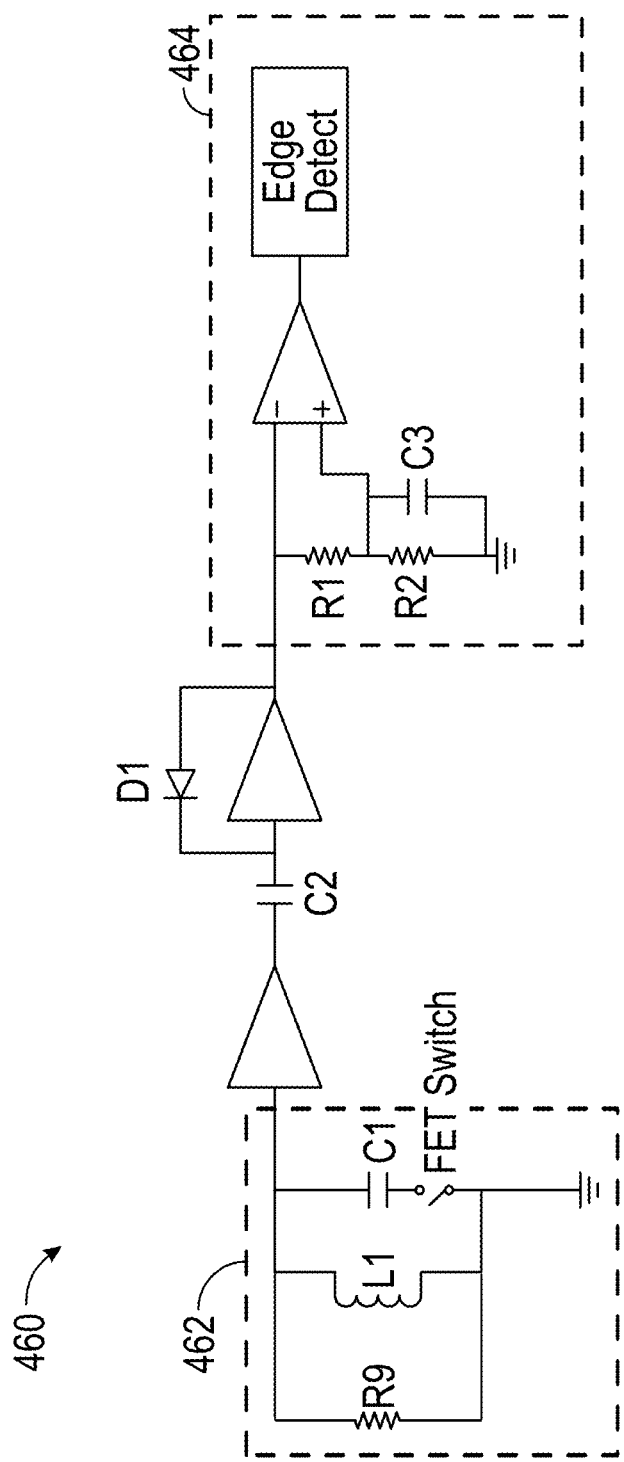
FIG. 4C is a block diagram of a single inductor direction-detector receiver that is another version of the receivers shown in FIGS. 4A and 4B and may be used with a ramp waveform

FIG. 4C is a block diagram of another example of a single inductor direction-detector receiver 460 that shares features of the receivers 400, 430 shown in FIGS. 4A and 4B. The receiver 460 can be used to detect an asymmetric ramp waveform (see, e.g., an example shown in FIG. 6). In FIG. 4C, the resonant receive tank circuit 462 includes the single inductor L1, a capacitor C1, and an FET switch. FIG. 4C also includes one waveform identifier circuit 464.

The FET switch opens when a ramp is being transmitted. This allows the high slew rate portion of the edge to pass through the inductor L1 without as much ringing that might result if capacitor C4 of the receiver 430 were in the circuit. The receiver 460 includes an edge detector (e.g., a Schmitt trigger) as part of the waveform feature identifier circuit 464.

Figure 5A:
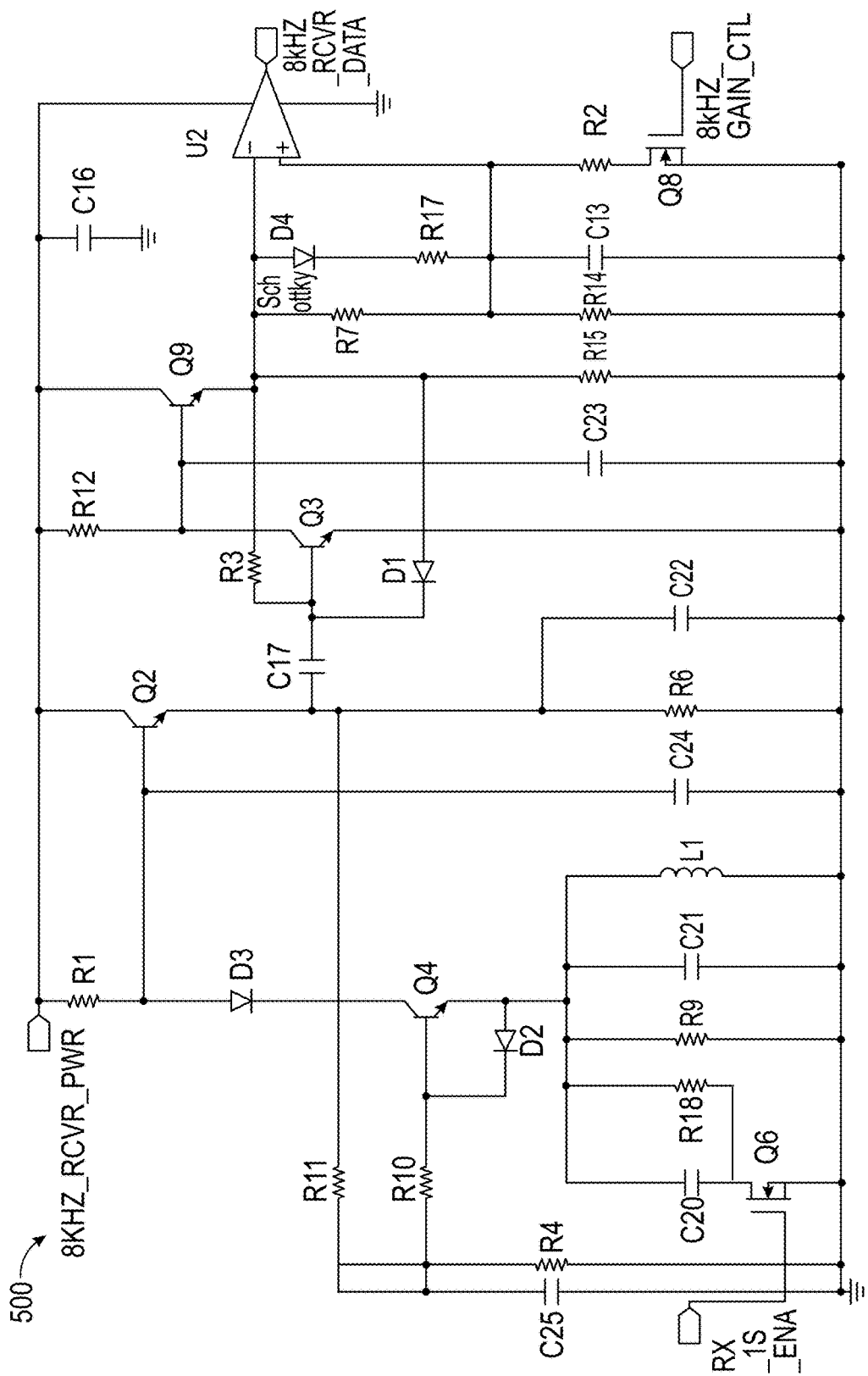
FIG. 5A shows an example schematic of a single inductor direction-detector receiver configured for dual sine wave detection with a tank circuit frequency shifter.

FIG. 5A shows an example schematic of a single inductor direction detector receiver 500. In this example, the receiver 500 is configured for dual sine wave detection with a tank circuit frequency shifter with one waveform feature identifier circuit 434. Examples of a receiver that can detect an asymmetric (e.g., dual sine wave) signal are described with reference to FIGS. 3A and 3B. This receiver 500 generally corresponds to the block diagram in FIG. 4B. Dual sine waves are described for illustration but the receivers disclosed herein can be used to detect other asymmetric signals comprising, e.g., superpositions of 3, 4, 5, 6, 10, 100, or more sinusoidal waves or other asymmetric signals.

As described with reference to FIGS. 4A-4C, the receiver circuit 500 uses a single inductor L1 to sense a single component of the magnetic field waveform generated by the current in a transmitter, such as the buried cable 104. The magnetic field (from the buried cable) induces a voltage on the inductor L1 which is part of the tank circuit 432 which includes capacitor C21, capacitor C20 (respectively corresponding to C1 and C4 in FIG. 4B) and resistor R9. The resistance value of resistor R9 can be adjusted in order to change the fractional bandwidth of the tank circuit 432. In this receiver, the capacitor C20 and resistor R18 will lower the resonant frequency and change the fractional bandwidth when an FET Q6 is tuned on. When Q6 is turned on, the center frequency of the tank circuit is lowered by $1/\sqrt{2}$ the factor f, which as described above can be the geometric mean of the frequencies of the asymmetric waveform (e.g., $\sqrt{1/2}$, $\sqrt{2/3}$, etc.). This allows upper and lower frequency components of the incoming signal to be equally spaced above and below the resonant frequency of the tank circuit. This may reduce or minimize phase shift variations due to tank circuit component variations.

Figure 5B:
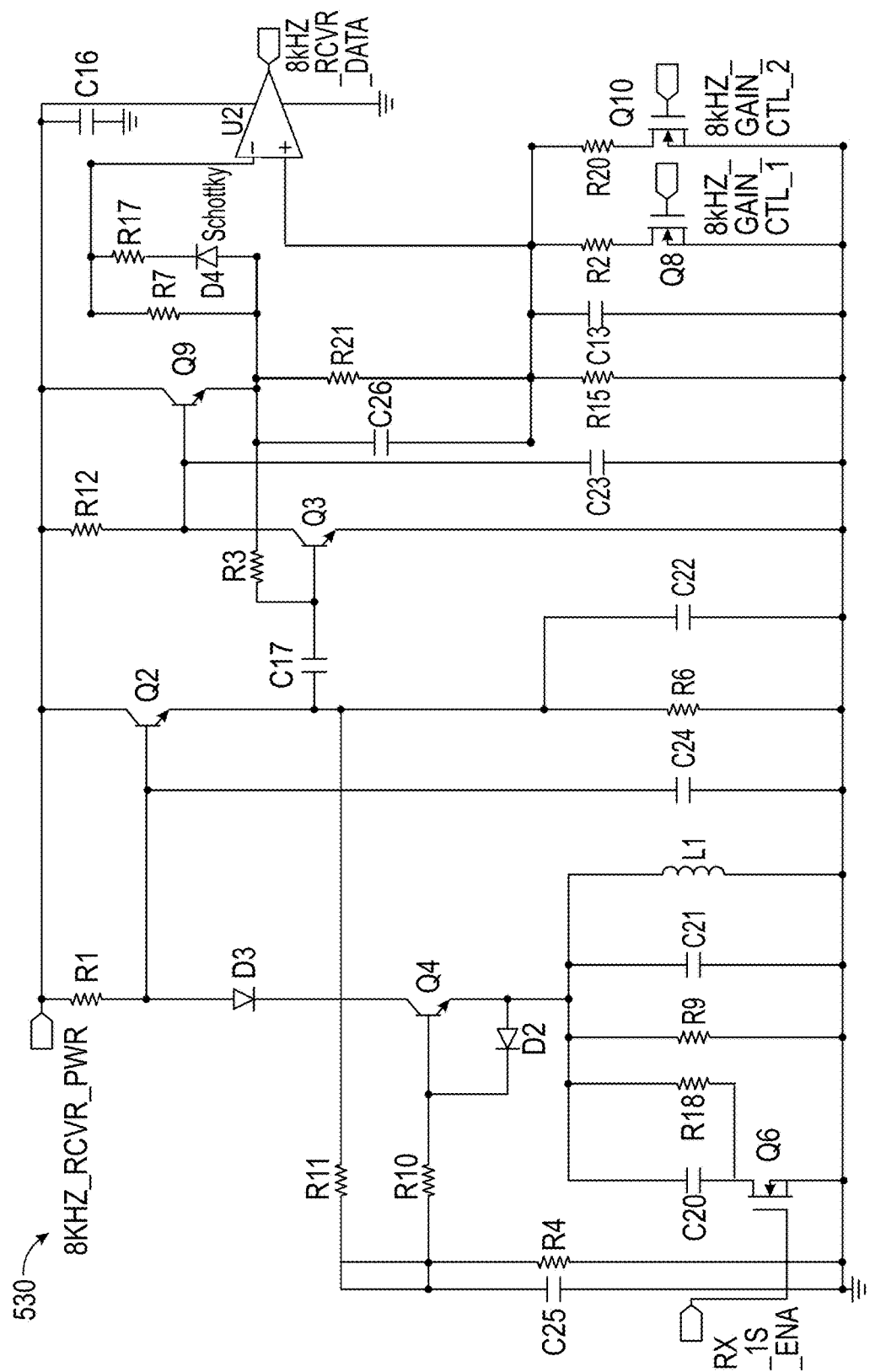
FIG. 5B shows another example schematic of a single inductor direction detector receiver for detecting a ramp waveform.

FIG. 5B shows an example schematic of another single inductor direction detector receiver 530. The circuit in FIG. 5B can be configured to generate outputs based on a plurality of (in this case, four) different gain values. A first gain control circuit includes resistor R2 and transistor Q8, where the gain can be set based at least in part on resistor R2, and an output can be taken from the transistor Q8. A second gain control circuit includes resistor R20 and transistor Q10, where the gain can be set based at least in part on R20, and an output can be taken from the transistor Q10. For outputs taken from either transistor Q8 or Q10, the gain can also be affected by the configuration of switch Q6. Accordingly, at least four different gains are possible, and other circuits can have additional configurations in the tank circuit 432 or more outputs, further increasing the number of selectable gains. Other systems can use other variable components, such as varactors, variable resistors, etc. to adjust the gain. A control loop can be implemented by firmware, logic 416, or other system to configured select among the gain configurations and sufficiently boost the detected signal without saturating the output stage. The single inductor direction detector receiver 530 can include a filter, such as the filter including resistor R21 and capacitor C26. Resistor R21 and capacitor C26 can have a common mode that is coupled to an input of the comparator U2, such as the non-inverting input.

The schematics shown in FIGS. 5A and 5B are substantially similar, but because of the different outputs of the comparator (into a frequency counter or into an edge detector, respectively), some component values (e.g., for capacitors, resistors, diodes, and active components) can be optimized differently.

A schematic corresponding to FIG. 4A, which features multiple waveform feature identifier circuits that each include a comparator, can be similar to the schematic 500. In comparison to the schematic 500, a schematic implementation corresponding to FIG. 4A can duplicate components R7, R14, and C13 (which form a low pass filter) and replace the U2 comparator device with a multi-channel (e.g., dual or quad channel) comparator device. In some embodiments, the dual channel schematic may or may not also duplicate diode D4 and resistor R17.

FIG. 6 is a graph that shows an example of a 500 Hz saw tooth waveform 606 that is bandwidth limited to 8 kHz. The y-axis 602 indicates a voltage in mV. The x-axis indicates time in ms. The waveform 606 has a positive slope on the rising portions of the waveform that is steeper (e.g., absolute magnitude of the slope is larger) than the negative slope on the falling portions of the waveform, and the waveform 606 has at least one asymmetric component.

The sawtooth waveform can produce a pulse at the receiver proportional to the edge rate of the faster edge (e.g., the steeper edge). This can allow the receiver to detect the polarity of the signal by detecting the direction of the received pulse. Any of the receivers described herein (e.g., FIGS. 4A-5B) can be used to detect the polarity of the example saw tooth waveform of FIG. 6.

Tilt Detection and Response

A person pushing a shopping cart may try to evade detection of their attempted theft of the cart by tilting the cart to avoid triggering a locking or braking wheel. For example, the person may tilt the cart near the perimeter so that the locking or braking wheel is raised well above the surface so as to reduce the likelihood that the receivers described herein that are disposed in the wheel will detect the electromagnetic signal from the buried cable. By tilting the cart and raising the wheel, the receiver circuits are moved farther away from the buried cable as the tilted cart is pushed across the containment boundary, which reduces the magnitude of the fluctuating VLF asymmetric magnetic field at the position of the wheel (due to the roughly 1/r falloff of the magnetic field), thereby reducing the likelihood that the magnetic field is detected. As discussed with respect to FIG. 2, the inductor 204 can be oriented on an axis that that is substantially parallel to the direction of the magnetic field vector $\vec{B}$ generated by the buried cable 104 such that a voltage is formed across the inductor 204. Operation of the circuits for determining the direction of the cart can be affected by the angle θ of the inductor 204 relative to the expected direction of the magnetic field (see FIG. 2). Changes in the angle caused by tilting the cart can reduce the sensitivity of the inductor 204. At certain inductor angles, the voltage across the inductor 204 can be too low to be reliably detected, which may allow the person to tilt the cart and pass over the buried cable 104 without triggering the anti-theft mechanism.

Accordingly, some embodiments of the wheel comprise an angle sensor, gyroscope, accelerometer, or other angle detection device 230 that can be used to detect whether or not the cart has been tilted. In some embodiments, an angle detection device 230 is alternatively (or additionally) included in the cart (e.g., in the frame). In the event that a tilt is detected (e.g., the tilt angle measured by the angle detection device exceeds a threshold angle, e.g., 10 degrees, 20 degrees, 30 degrees, 40 degrees, or more) and proximity to the buried cable is detected (e.g., the VLF signal from the cable 104 is detected), a corrective action can be taken such as, e.g., activating the anti-theft mechanism of the cart or sounding an alarm. The corrective action can be taken regardless of which direction of travel is determined or regardless of whether or not the direction of travel can be detected at all.

In some embodiments, the angle detection device 230 comprises an accelerometer that can determine the direction of the Earth's gravitational acceleration. For an untilted cart, the acceleration is along a vertical axis to the surface and can be measured as such by the accelerometer. However, if the cart is tilted, the accelerometer will also be tilted, and the measured vertical component of the gravitational acceleration will change, permitting determination of the tilt angle (e.g., the measured value will be reduced by the cosine of the tilt angle). Another embodiment of the angle detection device 230 comprises a low frequency (e.g., less than 100

Hz) magnetometer configured to detect the local vertical component of the Earth's magnetic field. As with the accelerometer, tilting the cart (and the magnetometer) leads to corresponding changes in the measured vertical geomagnetic component, from which the tilt angle can be determined.

Although the angle detection device 230 can be disposed in the wheel, in other embodiments, the angle detection device is (additionally or alternatively) disposed elsewhere in the cart, for example, in the frame or handlebars of the cart.

Example Cart Direction Detection Techniques with Non-Saturated Waveforms

Figure 7A:
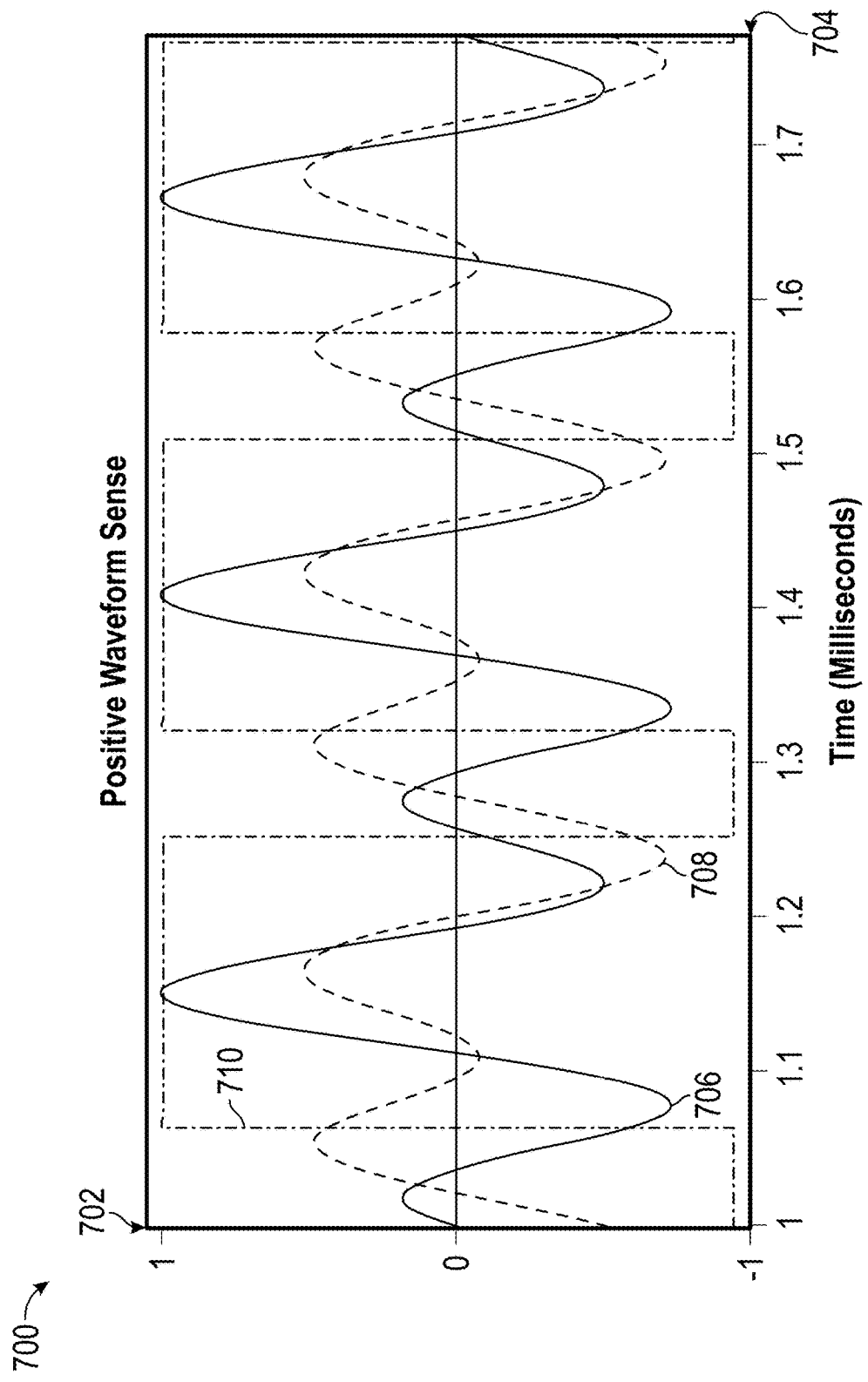
FIGS. 7A-7D are graphs that show example waveforms under unsaturated receiver conditions and how they can be used to determine the direction of a cart. The graphs in FIGS. 7A and 7C are for the cart wheel on a first side of the buried cable, and the graphs in FIGS. 7B and 7D are for the cart wheel on the other side of the buried cable.

FIG. 7A is a graph 700 that shows example waveforms that can be used to determine the direction of a cart. FIG. 700 includes a y-axis 702, an x-axis 704, a first curve 706, a second curve 708, and a third curve 710. The y-axis indicates a normalized scale for each curve in an appropriate unit (A/m for curve 706, V for curve 708, and V for curve 710). The x-axis indicates time in milliseconds.

The first curve 706 indicates a vector component of a magnetic field that is detected by the single inductor (e.g., L1) of a cart on a first side of a cable (and can be moving toward the cable in a first direction). The curve 706 can be the component of the magnetic field that is parallel to the axis of the single inductor. The first curve can be the sum of two sine waves one octave apart, at 7.776 kHz and 3.888 kHz, e.g., the ratio of frequencies is 2:1 (similar to the waveform of the current in FIG. 3B), where the amplitude of the 7.776 kHz component is 1.5 times the amplitude of the 3.888 kHz component. In the example graph 700, the normalized scale for the first curve 706 is +/−0.02 A/m, but the normalized scale can be different in various embodiments.

The first curve 706 can be linearly related to the current in a buried cable (e.g., the generated magnetic field is proportional to cable current according to the Biot-Savart law). The first curve 706 can, in some embodiments, have a zero DC component. The first curve can also be asymmetric about a zero in the y-axis. The peak amplitude of the first curve 706 in one direction (e.g., the positive direction) is about 33% greater than the peak amplitude in the other direction. In some embodiments, the difference in peak amplitudes, slopes, or other characteristics can be about 25% to 50% greater in one direction versus the other direction.

A second curve 708 can be a voltage formed across the single inductor (e.g., the inductor L1 in FIG. 4A, FIG. 4B, or FIG. 4C) in a tank circuit (e.g., tank circuit 402, 430, or 462). The voltage can be provided to an amplifier (e.g., amplifier 404 in FIG. 4A). In FIG. 5A, FIG. 5B, the voltage can be provided at the node between inductor L1, capacitor C21, resistor R2, diode D2, and transistor Q4. In the example graph 700, the normalized scale for the second curve 708 is +/−100 mV, but the normalized scale can be different in various embodiments.

The third curve 710 can be an output (8 kHz_RCVR_DATA in FIG. 5A and FIG. 5B) of a comparator (e.g., the comparator 408 or 410). In the example graph 700, the normalized scale for the third curve 710 can be 0 to VDD (which can be 1.8 V in some embodiments) or any digital output, but the normalized scale can be different in various embodiments.

Figure 7B:
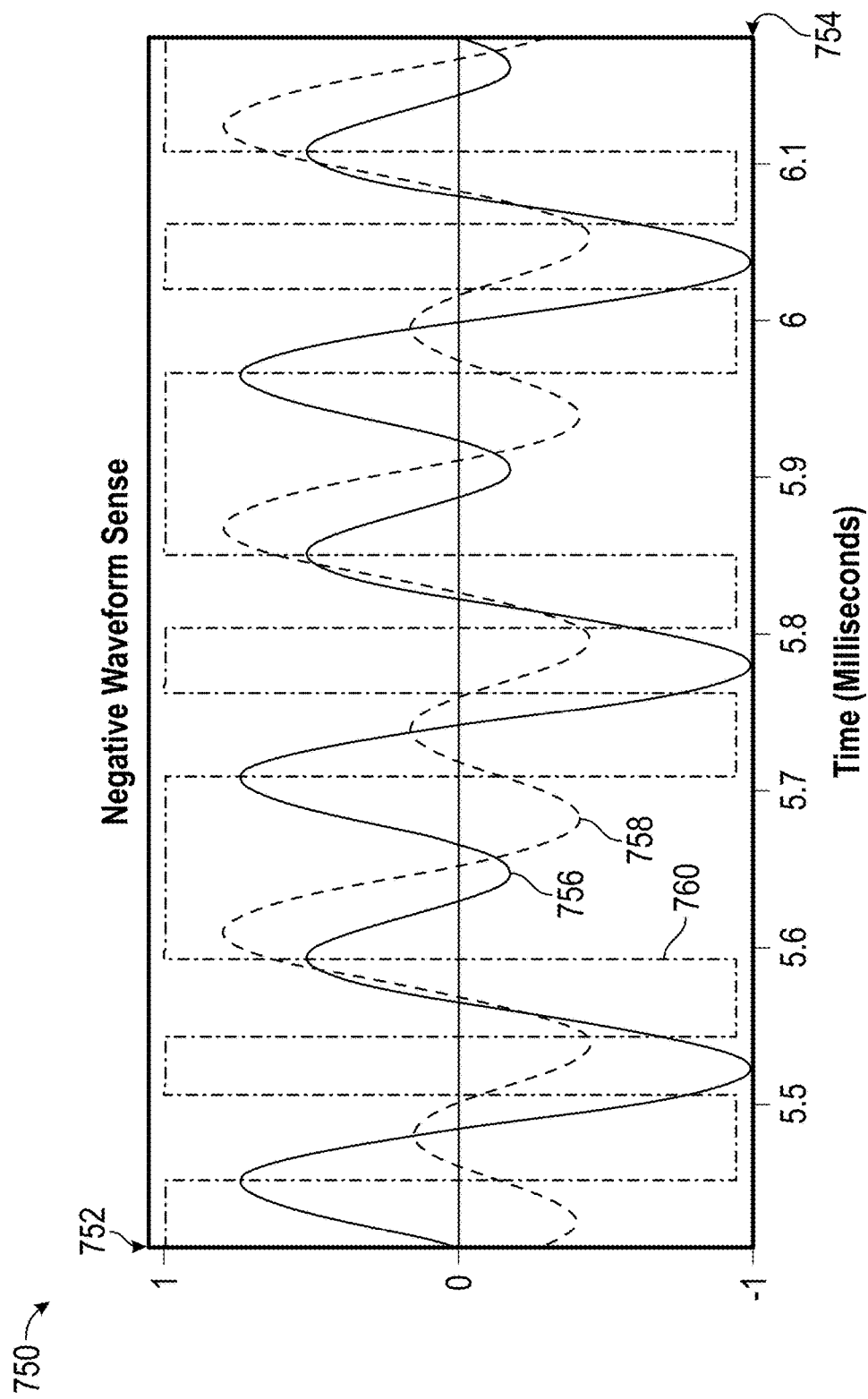

FIG. 7B is a graph 750 that shows example waveforms that can be used to determine the direction of a cart. FIG. 750 includes a y-axis 752, an x-axis 754, a first curve 756, a second curve 758, and a third curve 760. The solid, dashed, and dot-dashed curves in FIG. 7B correspond to the same curves as described with respect to FIG. 7A, except in FIG. 7B, the cart is on a second side of a cable and can be moving toward the cable from a second direction.

Figure 7C:
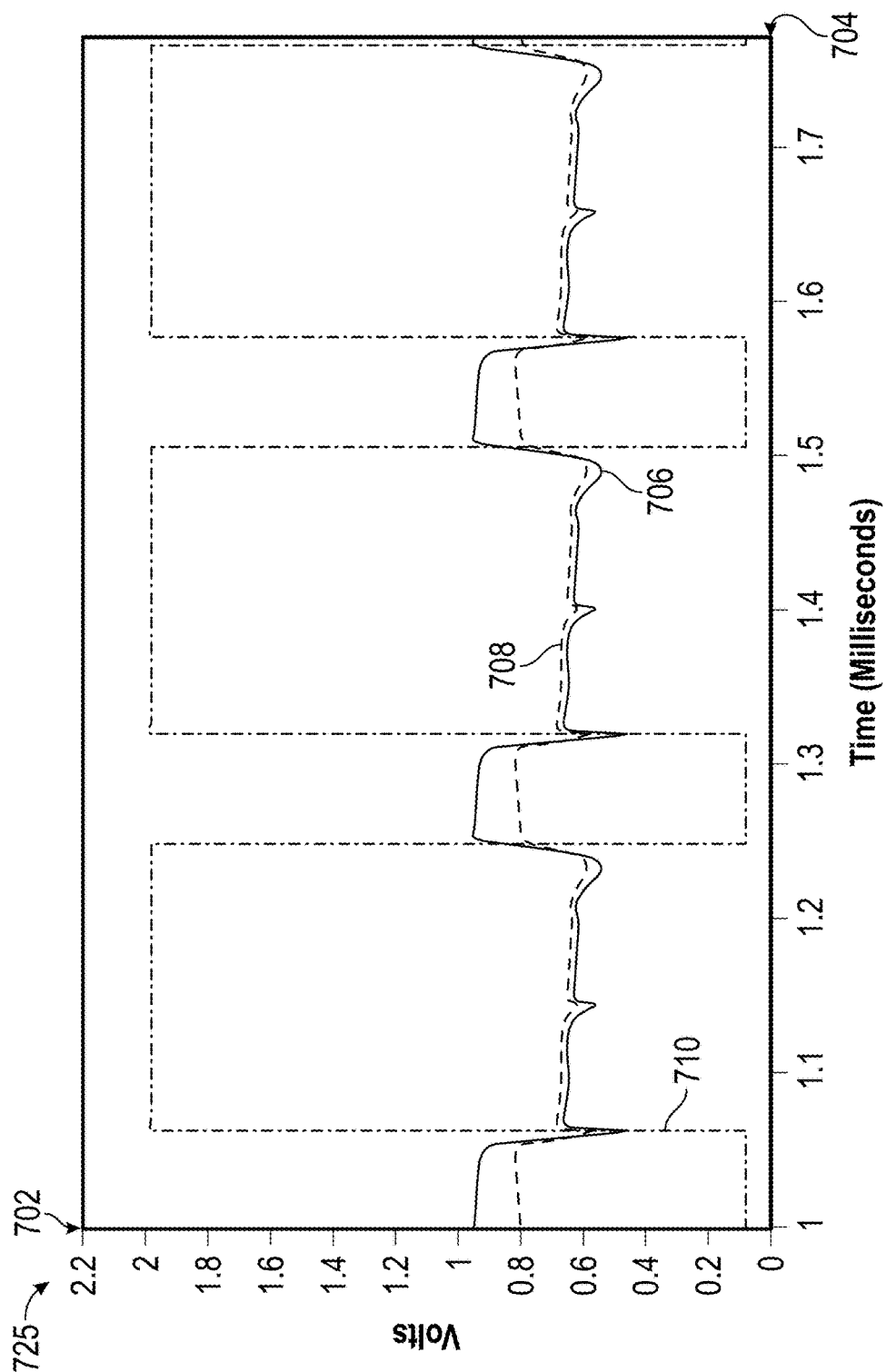
Figure 7D:
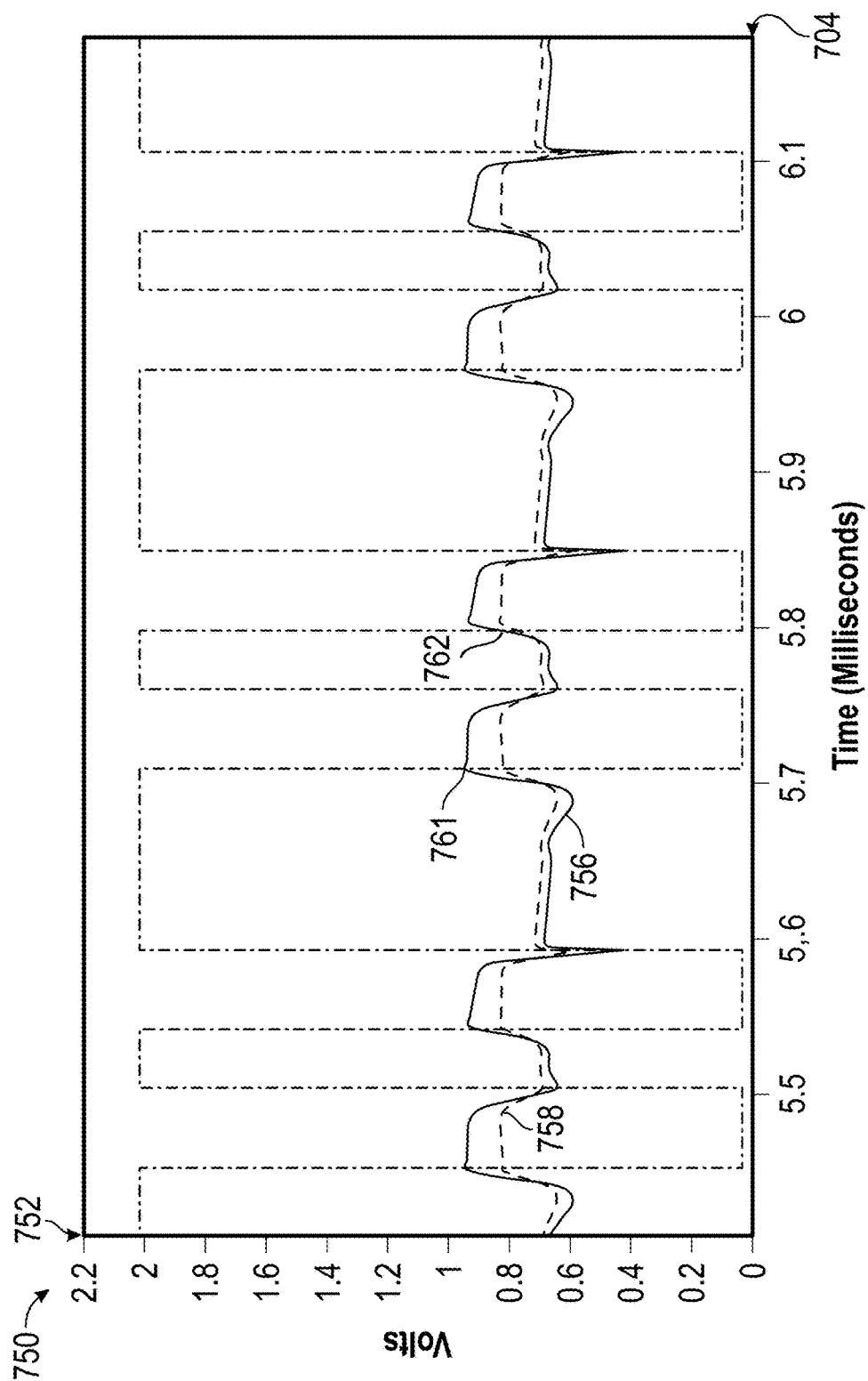

FIGS. 7C and 7D are generally similar to FIGS. 7A and 7B, respectively, but at different points in the circuit. In FIG. 7C, the solid curve 706 is the negative input to the comparator, the dashed curve 708 is the positive input to the comparator (e.g., represents a low pass filtered version of the amplifier output), and the dot-dashed curve 710 is the comparator output.

In comparing FIG. 7A and FIG. 7B (or FIGS. 7C and 7D), the comparator output toggles once per 257 microsecond cycle (1/3.888 kHz) when the magnetic field waveform orientation is positive (e.g., when the cart is on the first side of the cable as shown in FIG. 7A), and the comparator toggles twice per 257 microsecond cycle when the magnetic field waveform orientation is negative (e.g., when the cart is on the second side of the cable as shown in FIG. 7B). Thus, by counting the frequency with which the comparator output toggles (3.888 kHz or 7.776 kHz) it can be determine whether the magnetic field is oriented positively or negatively, and thus which side of the buried cable that the cart is on. In some embodiments, the output of the comparator can be delayed (e.g., by about 8 microseconds) due to circuit delays.

There can be an error band around the two expected frequencies to add some noise tolerance. For example, if the measured comparator toggle frequency is within 10% of 3.888 kHz, the cart can be determined to be on the first side of the buried cable, and if the measured comparator toggle frequency is within 10% of 7.776 kHz, the cart can be determined to be on the second side of the buried cable. If the comparator toggle rate is not within either of those two frequency ranges, the system can assume that the signal is too noisy to be trusted and can keep measuring until a valid toggle rate is detected.

Example Cart Direction Detection Techniques Under Saturation Conditions

The waveforms in FIGS. 7A-7D show examples where the receiver is unsaturated. Under certain conditions, such as if the inductor is positioned very close to the buried cable (e.g., when the wheel crosses the containment boundary), then the magnetic field strength can become relatively stronger and the receiver may saturate.

Figure 8A:
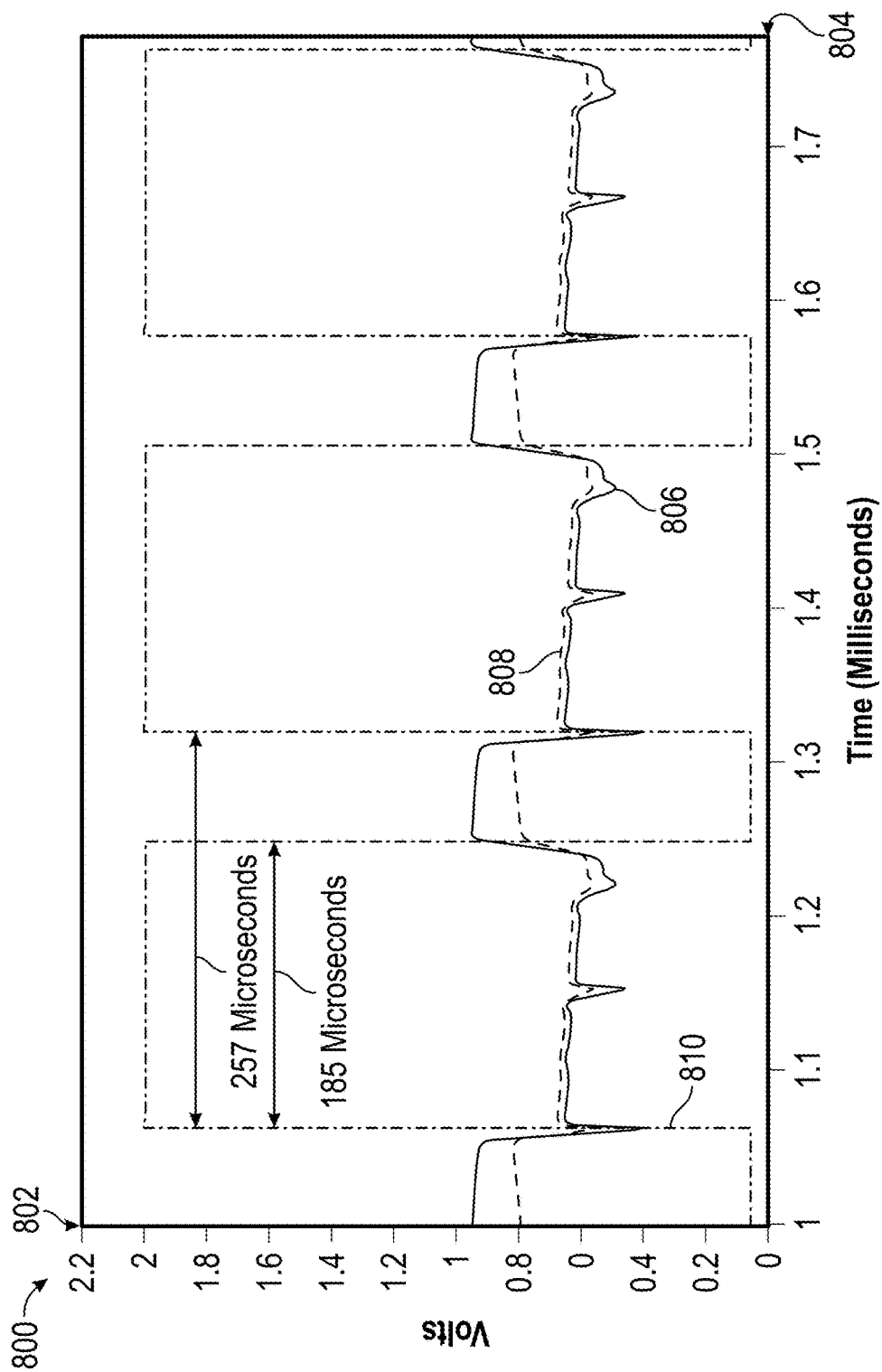
FIGS. 8A and 8B are graphs that show example waveforms under saturated receiver conditions and how they can be used to determine the direction of a cart.

FIG. 8A is a graph 800 that shows example waveforms under saturation conditions that can be used to determine the direction of a cart. The graph 800 includes a y-axis 802, an x-axis 804, a first curve 806, a second curve 808, and a third curve 810 that correspond to the axis and curves discussed with respect to FIG. 7A.

Figure 8B:
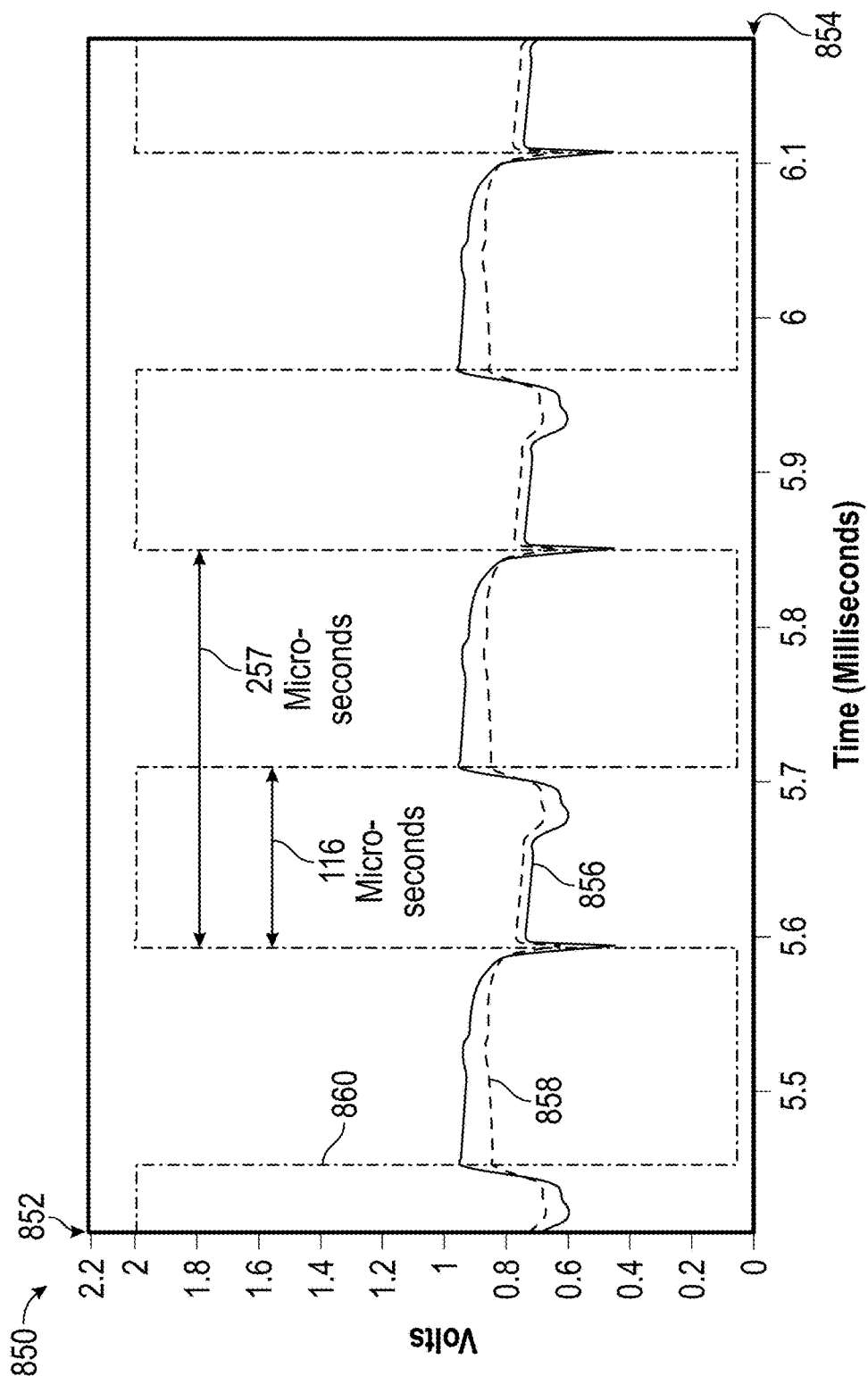

FIG. 8B is a graph 850 that shows example waveforms under saturation conditions that can be used to determine the direction of a cart. The graph 850 includes a y-axis 852, an x-axis 854, a first curve 856, a second curve 858, and a third curve 860 that correspond to the axis and curves discussed with respect to FIG. 7B.

Under the saturation conditions of FIG. 8A and FIG. 8B, the receiver is saturated and no longer linear. This can happen, for example, if the strength of the magnetic field increases (e.g., doubles, triples, exceeds a threshold such as 0.04 A/m) as a receiver approaches the buried cable. In some embodiments, firmware, feedback, or other control system can adjust a gain to keep the receiver in the linear range. Nonetheless, a receiver can still saturate even with adjustments to gain.

In the example saturation conditions shown in both FIG. 8A and FIG. 8B, the comparator toggles at the same rate, once per 257 microsecond cycle. However, the duty cycle of the comparator output is different and can be used to determine which side of a cable that the cart is on or approaching from. In FIG. 8A, the comparator output signal 810 has a high duty cycle of about 72% when the cart is on the first side of the buried cable. In FIG. 8B, the comparator output signal 860 has a high duty cycle of about 45% when the cart is on the second side of the buried cable.

Some microcontrollers have hardware which can perform automatic duty cycle measurement on a specified input. The microcontrollers can, based at least in part on the duty cycle, determine which side of the buried cable that a cart is on. In some embodiments, the duty cycle measurement can be performed by firmware or other circuits by timing the rising and falling edges and then calculating the duty cycle.

Example Cart Direction Detection Techniques

With respect to FIG. 4A and FIG. 7A-7D, a tank circuit 402 detects a single component of a magnetic field (e.g., the component of the fluctuating magnetic field that is parallel to the single inductor L1), which can be amplified by the second receive amplifier 406 to generate an amplified signal 706 or 756. The amplified signal 706 or 756 can be compared to a low pass filtered version (708, 758, respectively) of that same signal 706 or 756. An example low pass filter in FIG. 4A includes resistor R1, resistor R2, and capacitor C3. The combination of the low pass filter and comparator can be referred to as a data slicer because it slices the continuous analog amplifier 406 output into discrete time chunks which are individual bits.

In some designs, it can be less cost effective and less power efficient to implement the low pass filter to make the filter characteristics such as time constant and voltage offset dynamic. For example, digitizing the signal and using a digital signal processor (DSP) can consume too much power for a battery powered wheel if a design goal includes having an active power consumption of a value that is much less than 1 mW. The example circuits shown in FIG. 5A and FIG. 5B consume power on the order of about 30 to 100 µW when the line is being driven, and consume power on the order of 20 µW when the line is not being driven.

In some embodiments, component values for the low pass filter can be selected to achieve adequate compromise performance characteristics across various scenarios. However, in some situations where the amplitude of the magnetic field component parallel to the inductor axis (e.g., the maximum of the dot product of B with a unit vector parallel to the inductor axis) is changing relatively quickly (e.g., at least 35%, at least 25%, at least 45% decline in amplitude over about two cycles or less) to the waveform repeat time (e.g., 257 microseconds in FIG. 8A and FIG. 8B), a situation can occur where a second trip point of the comparator does not always trip. FIG. 7D shows examples of a first trip point 761 and a second trip point 762. The first trip point 761 can happen at the same time or either side of the buried cable, whereas the second trip point 762 typically only happens on the negative side of the cable. When the second trip point of the comparator does not trip, the comparator output can appear superficially similar to the saturated receiver described with reference to FIG. 8A and FIG. 8B.

The amplitude of the magnetic field component parallel to the inductor axis can change relatively quickly under certain conditions. For example, the change can occur when a receiver approaches a location where a buried cable 104 makes a sharp bend, such as a right angle. More practical, large-scale cable burying tools can cut grooves into the ground in a straight line for burying a cable. To avoid sharp bends, two 45-degree beveled corners can be spread several inches to several feet apart instead of having a right angle. As another example, the change can occur when the receiving inductor travels a path that is nearly parallel to and nearly directly above the buried cable 104. There can be little to no vertical component of the magnetic field $\vec{B}$. When the magnetic field $\vec{B}$ is imposed on an inductor of a finite radius under such conditions, the resulting EMF induced in the inductor can be very noisy. As another example, the change can occur due to high levels of background noise, such as if a cart travels close to a high current power line in a buried conduit.

In some embodiments, DSPs can dynamically change filter settings to adjust for these conditions. In some embodiments where power constraints make DSP impractical, a circuit can implement two different fixed low pass filters with different characteristics, and two different comparator outputs can be generated (e.g., as shown in FIG. 4B). Based on differences in the outputs of the two different comparators, the position of a cart with respect to the buried cable 104 can be determined with greater accuracy.

Different algorithms can be used to determine the position of the cart based on the outputs of different comparators. In an example, the outputs of two different comparators with low pass filters are the same, then the cart can be determined to be on a first side of the buried cable 104. If either of the outputs of the two comparators is fairly consistently counting two transitions per cycle (e.g., as shown in FIG. 7D), then the cart can be determined to be on the second side of the buried cable 104.

Additional Embodiments

In some cases it may be desirable to encode additional information in the signal beyond which direction in which the wheel is crossing the buried line. For example, there may be multiple doors with a buried line marking the door. It may be useful to also encode which door of the multiple doors the wheel is passing through, along with the direction.

One way to achieve encode the additional information (e.g., which door) is to consider an interval of fixed duration (e.g., a bit cell) of low frequency (e.g., 3.888 kHz) toggling to be one value (e.g., "1") in a signaling code, with an interval of high frequency (e.g., 7.776 kHz) toggling to be an alternate value (e.g., "−1"). A variety of coding schemes can handle the ambiguity of whether a given bit cell was sent as a "1" with the receiver on the positive side of the buried cable or as a "−1" with the receiver on the negative side.

In some embodiments, an encoding scheme can include an inversion tolerant duobinary line coding scheme such as Alternate Mark Inversion or a differential ternary code such as MLT-3.

In some embodiments, an encoding scheme can include an asynchronous code with a start bit of known polarity. If a start bit of reversed polarity is found, then a direction-detector can determined that the cart is on the negative side of the buried line and invert all the received bits.

In some embodiments, an encoding scheme can include sending codewords out of a set of codewords such that the Hamming distance between valid codewords is at least two, and that the inversion of any valid codeword is not a valid codeword. Both the received bit string and the inversion of the received bit string can be tested, and the string with the lowest Hamming distance to a valid codeword can be selected.

Although certain embodiments of the single inductor direction detector have been described as being disposed within the wheel of the cart, this is for illustration and is not a requirement. In other embodiments, some or all of the receiver components can be disposed in other portions of the cart. As one example, the single inductor (e.g., the resonant tank circuit) can be disposed in a frame of the cart, e.g., a lower plastic portion of the frame where the inductor is not shielded from the containment signal by metal tubing. Other variations are possible.

Additional Example Embodiments

Additional example embodiments can include the following.

In a first embodiment, a system to detect whether an object crosses a boundary in a direction, the system comprising: a cable surrounding a containment area and defining a boundary of the containment area; a transmitter electrically connected to the cable and configured to transmit a radio frequency (RF) containment signal to the cable, the containment signal comprising an asymmetric component wherein a magnitude of a positive slope of the signal is different from a magnitude of a negative slope of the signal; and a receiver configured to detect the RF containment signal, the receiver comprising a resonant tank circuit having a single inductor, wherein the system determines a direction of the object relative to the boundary of the containment area by comparing an electromotive force (EMF) induced in the single inductor by a first features of the signal with an EMF induced in the single inductor by a second feature of the signal.

In a second embodiment, the system of embodiment 1, wherein the object comprises a wheel of a human-propelled cart.

In a third embodiment, the system of embodiment 2, wherein the cart comprises a shopping cart.

In a fourth embodiment, the system of any one of embodiments 1-3, wherein the containment area comprises a parking lot of a retail store.

In a fifth embodiment, the system of any one of embodiments 2-5, wherein the receiver is disposed in the wheel.

In a sixth embodiment, the system of any one of embodiments 1-5, wherein the RF containment signal comprises a very low frequency (VLF) signal.

In a seventh embodiment, the system of embodiment 6, wherein the VLF signal is below about 9 kHz.

In an eighth embodiment, the system of any one of embodiments 1-7, wherein an inductance of the single inductor is in a range from 1 mH to 50 mH.

In a ninth embodiment, the system of any one of embodiments 1-8, wherein the RF containment signal comprises a first frequency and a second frequency, and a ratio of the second frequency to the first frequency is about 2:1 or about 3:2.

In a 10th embodiment, the system of any one of embodiments 1-9, wherein the receiver comprises a frequency counter or an edge detector.

In an 11th embodiment, the system of any one of embodiments 1-10, wherein, when installed, the cable is buried below a surface of the containment area.

In a 12th embodiment, the system of any one of embodiments 1-11, wherein the single inductor is disposed at an angle relative to a vertical to a surface of the containment area. The angle can be about zero degrees, about 90 degrees, or in a range from about 5 degrees to about 25 degrees.

In a 13th embodiment, the system of any one of embodiments 1-12, wherein the RF containment signal comprises a bandwidth limited saw tooth ramp.

In a 14th embodiment, the system of any one of embodiments 1-13, wherein the receiver further comprises a receive input amplifier.

In a 15th embodiment, the system of any one of embodiments 1-14, wherein the receiver comprises a clamp circuit.

In a 16th embodiment, the system of any one of embodiments 1-15, wherein the receiver comprises a comparator.

In a 17th embodiment, a receiver configured to detect an RF containment signal near a boundary of a containment area, the receiver comprising: a resonant tank circuit having a single inductor, wherein the system determines a direction of the receiver relative to the boundary of the containment area by comparing an electromotive force (EMF) induced in the single inductor by the positive slope of the signal with an EMF induced in the single inductor by the negative slope of the signal.

In an 18th embodiment, a wheel for a human-propelled cart, the wheel comprising the receiver of embodiment 17.

In a 19th embodiment, the wheel of embodiment 18 further comprising a brake configured to inhibit motion of the cart when actuated.

In a 20th embodiment, a containment system comprising the receiver of embodiment 17 or the wheel of embodiment 18 or 19, a cable, and a radio frequency transmitter configured to be electrically connected to the cable.

In a 21st embodiment, a system to detect whether a human-propelled cart having a wheel crosses a boundary, the system comprising: a cable surrounding a containment area and defining a boundary of the containment area; a transmitter electrically connected to the cable and configured to transmit a radio frequency (RF) containment signal to the cable, the containment signal comprising an asymmetric, fluctuating component, the cable thereby generating an asymmetric, fluctuating magnetic field having three components; and a wheel comprising a receiver configured to detect the RF containment signal, the receiver comprising: a resonant tank circuit having a single inductor configured to measure a single component of the three components of the asymmetric, fluctuating magnetic field, and a hardware processor programmed to determine a direction of the cart relative to the boundary of the containment area based at least in part on the measured single component of the three components of the asymmetric, fluctuating magnetic field.

In a 22nd embodiment, the system of embodiment 1, wherein the human-propelled cart comprises a shopping cart.

In a 23rd embodiment, the system of embodiment 21 or 22, wherein the asymmetric fluctuating component of the containment signal is invariant under inversion and phase shifting.

In a 24th embodiment, the system of any one of embodiments 21 to 23, wherein the asymmetric fluctuating component of the containment signal comprises a first sinusoidal component having a first frequency and a second sinusoidal component having a second frequency less than the first frequency.

In a 25th embodiment, the system of embodiment 24, wherein a ratio of the second frequency to the first frequency is ½ or ⅔.

In a 26th embodiment, the system of embodiment 24 or 25, wherein the first frequency and the second frequency are less than 9 kHz.

In a 27th embodiment, the system of any one of embodiments 21 to 26, wherein the hardware processor is programmed to determine the direction of the cart relative to the boundary of the containment area by identifying a plurality of features of the asymmetric fluctuating component of the containment signal during a time period that is less than a period of the asymmetric fluctuating component.

In a 28th embodiment, the system of any one of embodiments 21 to 27, wherein the receiver comprises a comparator configured to compare a signal representative of the measured single component of the asymmetric, fluctuating magnetic field with a low-pass filtered representation of the measured single component of the asymmetric, fluctuating magnetic field.

In a 29th embodiment, the system of embodiment 28, wherein the hardware processor is programmed to determine the direction of the cart relative to the boundary of the containment area based at least in part on a frequency at which the comparator output toggles.

In a 30th embodiment, the system of embodiment 28 or 29, wherein the hardware processor is programmed to determine the direction of the cart relative to the boundary of the containment area based at least in part on a duty cycle of output from the comparator.

In the 31st embodiment, the system of any one of embodiments 21 to 30, wherein the resonant tank circuit comprises a switch configured to switch between a first resonant frequency and a second resonant frequency different from the first resonant frequency.

In a 32nd embodiment, the system of any one of embodiments 21 to 31, wherein the receiver comprises a plurality of gain control circuits configured to boost the measured single component of the asymmetric, fluctuating magnetic field without saturating an output stage of the receiver.

In a 33rd embodiment, the system of any one of embodiments 21 to 32, wherein the single inductor is disposed on a non-rotating chassis of the wheel.

In a 34th embodiment, the system of embodiment 33, wherein the single inductor has an axis that makes a non-zero angle with respect to a vertical direction.

In a 35th embodiment, the system of any one of embodiments 21 to 34, wherein the cart comprises an anti-theft system, and the system is further configured to trigger the anti-theft system in response to determining the cart crosses the boundary in a first direction and to not trigger the anti-theft system in response to determining the cart crosses the boundary in a second direction opposite to the first direction.

In a 36th embodiment, the system of embodiment 35, wherein the wheel comprises a brake configured to inhibit motion of the cart when the anti-theft system is triggered.

In a 37th embodiment, the system of embodiment 35 or 36, wherein the wheel or the cart comprises an angle detection device configured to determine a tilt angle of the cart, and the system is further configured to trigger the anti-theft system in response to determining the tilt angle exceeds a threshold and the receiver has measured the containment signal.

In a 38th embodiment, a receiver configured to detect a radio frequency (RF) containment signal near a boundary of a containment area, the receiver comprising: a resonant tank circuit having a single induction circuit configured to detect a single component of a magnetic field associated with the RF containment signal; a first comparator configured to compare a signal associated with the detected single component of the magnetic field against a first low-pass filtered representation of the signal; and a logic control circuit configured to determine a position of the receiver relative to the boundary of the containment area based at least in part on a first output from the first comparator.

In a 39th embodiment, the receiver of embodiment 38, further comprising a frequency counter configured to receive the output from the comparator.

In a 40th embodiment, the receiver of embodiment 38 or 39, further comprising an edge detector configured to receive the output from the comparator.

In a 41st embodiment, the receiver of any one of embodiments 38 to 40, wherein: the receiver comprises a second comparator configured to compare the signal associated with the detected single component of the magnetic field against a second low-pass filtered representation of the signal, and the logic control circuit is configured to determine the position of the receiver relative to the boundary of the containment area based at least in part on the first output from the first comparator and the second output from the second comparator.

In a 42nd embodiment, the receiver of any one of embodiments 38 to 41, wherein the logic control circuit is configured to determine the position of the receiver relative to the boundary of the containment area based at least in part on a duty cycle of the first output from the first comparator.

In a 43rd embodiment, the receiver of any one of embodiments 38 to 42, wherein the RF containment signal comprises a first sinusoidal component having a first frequency and a second sinusoidal component having a second frequency less than the first frequency.

In a 44th embodiment, the receiver of embodiment 43, wherein a ratio of the second frequency to the first frequency is ½ or ⅔.

In a 45th embodiment, the receiver of embodiment 43 or 44, wherein the first frequency and the second frequency are less than about 9 kHz.

In a 46th embodiment, a wheel for a human-propelled cart, the wheel comprising the receiver of any one of embodiments 38 to 45.

In a 47th embodiment, the wheel of embodiment 46 further comprising a brake configured to inhibit motion of the wheel when the brake is triggered.

ADDITIONAL CONSIDERATIONS

Certain processing steps or acts of the methods disclosed herein may be implemented in hardware, software, or firmware, which may be executed by one or more general and/or special purpose computers, processors, or controllers, including one or more floating point gate arrays (FPGAs), programmable logic devices (PLDs), application specific integrated circuits (ASICs), and/or any other suitable processing device. In certain embodiments, one or more functions provided by a controller may be implemented as software, instructions, logic, and/or modules executable by one or more hardware processing devices. In some embodiments, the software, instructions, logic, and/or modules may be stored on computer-readable media including non-transitory storage media implemented on a physical storage device and/or communication media that facilitates transfer of information. In various embodiments, some or all of the steps or acts of the disclosed methods or controller functionality may be performed automatically by one or more processing devices. Many variations are possible.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. As used herein, a phrase referring to "at least one of" a list of items refers to any combination of those items, including single members. As an example, "at least one of a, b, or c" (or "at least one of a, b, and c") is intended to cover: a, b, c, a-b, a-c, b-c, and a-b-c. In addition, the articles "a," "an", and "the" as used in this application and the appended claims are to be construed to mean "one or more" or "at least one" unless specified otherwise.

The example experiments, experimental data, tables, graphs, plots, photographs, figures, and processing and/or operating parameters (e.g., values and/or ranges) described herein are intended to be illustrative of operating conditions of the disclosed systems and methods and are not intended to limit the scope of the operating conditions for various embodiments of the methods and systems disclosed herein. Additionally, the experiments, experimental data, calculated data, tables, graphs, plots, photographs, figures, and other data disclosed herein demonstrate various regimes in which embodiments of the disclosed systems and methods may operate effectively to produce one or more desired results. Such operating regimes and desired results are not limited solely to specific values of operating parameters, conditions, or results shown, for example, in a table, graph, plot, figure, or photograph, but also include suitable ranges including or spanning these specific values. Accordingly, the values disclosed herein include the range of values between any of the values listed or shown in the tables, graphs, plots, figures, photographs, etc. Additionally, the values disclosed herein include the range of values above or below any of the values listed or shown in the tables, graphs, plots, figures, photographs, etc. as might be demonstrated by other values listed or shown in the tables, graphs, plots, figures, photographs, etc. Also, although the data disclosed herein may establish one or more effective operating ranges and/or one or more desired results for certain embodiments, it is to be understood that not every embodiment need be operable in each such operating range or need produce each such desired result. Further, other embodiments of the disclosed systems and methods may operate in other operating regimes and/or produce other results than shown and described with reference to the example experiments, experimental data, tables, graphs, plots, photographs, figures, and other data herein. Also, for various values disclosed herein, relative terms "about", "nearly", "approximately", "substantially", and the like may be used. In general, unless indicated otherwise, relative terms mean within ±20%, within ±15%, within ±10%, within ±5%, depending on the embodiment.

Thus, while only certain embodiments have been specifically described herein, it will be apparent that numerous modifications may be made thereto without departing from the spirit and scope of the disclosure. Further, acronyms are used merely to enhance the readability of the specification and claims. It should be noted that these acronyms are not intended to lessen the generality of the terms used and they should not be construed to restrict the scope of the claims to the embodiments described therein.

What is claimed is:

1. A system configured to detect whether an object crosses a boundary of a containment area, the system comprising:
    a receiver configured to detect a radio frequency (RF) containment signal near the boundary of the containment area, the RF containment signal comprising an asymmetric, time-varying component that is associated with an asymmetric, time-varying magnetic field;
    the receiver comprising:
        a resonant tank circuit having a single inductor circuit that has a single inductor axis,
        wherein the single inductor circuit is configured to be responsive to a component of the asymmetric, time-varying magnetic field that is parallel to the single inductor axis; and
    a hardware processor programmed to:
        determine a direction of movement of the object relative to the boundary of the containment area based at least in part on the response of the single axis inductor circuit to the component of the asymmetric, time-varying magnetic field that is parallel to the single inductor axis.

2. The system of claim 1, wherein the receiver comprises a waveform feature identifier circuit comprising:
    a comparator configured to receive a signal from the single inductor circuit; and
    a frequency counter configured to receive output from the comparator and to count or determine timings of changes in output from the comparator, or
    an edge detector configured to receive output from the comparator.

3. The system of claim 2, wherein the comparator is configured to compare a signal representative of the component of the asymmetric, time-varying magnetic field with a low-pass filtered representation of the component of the asymmetric, time-varying magnetic field.

4. The system of claim 2, wherein the hardware processor is programmed to determine the direction of movement of the object relative to the boundary of the containment area based at least in part on a frequency at which the comparator output toggles.

5. The system of claim 2, wherein the hardware processor is programmed to determine the direction of movement of the object relative to the boundary of the containment area based at least in part on a duty cycle of output from the comparator.

6. The system of claim 2, further comprising an amplifier configured to amplify the signal from the single inductor circuit prior to receipt by the comparator.

7. The system of claim 2, wherein the comparator is configured to trip at a voltage below a positive edge of the signal from the single inductor circuit.

8. The system of claim 1, wherein the asymmetric, time-varying component of the RF containment signal is invariant under inversion and phase shifting.

9. The system of claim 1, wherein the asymmetric, time-varying component of the RF containment signal comprises a first sinusoidal component having a first frequency and a second sinusoidal component having a second frequency less than the first frequency.

10. The system of claim 9, wherein a ratio of the second frequency to the first frequency is ½ or ⅔.

11. The system of claim 9, wherein the first frequency and the second frequency are less than 9 kHz.

12. The system of claim 1, wherein the resonant tank circuit comprises a switch configured to switch the resonant tank circuit between a first resonant frequency and a second resonant frequency different from the first resonant frequency.

13. The system of claim 1, wherein:
the asymmetric, time-varying component of the RF containment signal comprises a first sinusoidal component having a first frequency and a second sinusoidal component having a second frequency at a fraction f<1 of the first frequency, and
the resonant tank circuit comprises a switch configured to lower a resonant frequency of the resonant tank circuit by a factor equal to the square-root of f.

14. The system of claim 1, wherein the receiver comprises a gain control circuit configured to boost a signal from the single inductor circuit without saturating an output stage of the receiver.

15. The system of claim 1, wherein the hardware processor is programmed to determine the direction of movement of the object relative to the boundary of the containment area by identifying a plurality of features of the asymmetric, time-varying component of the containment signal during a time period that is less than a period of the asymmetric, time-varying component.

16. The system of claim 1, further comprising an angle detection device configured to determine whether the object has been tilted.

17. The system of claim 16, wherein the angle detection device comprises an angle sensor, a gyroscope, or an accelerometer.

18. The system of claim 1, wherein the object is a wheeled-cart, and the receiver is disposed in the cart.

19. The system of claim 18, wherein the receiver is disposed in a wheel of the cart.

20. The system of claim 19, wherein the single inductor circuit is disposed on a non-rotating chassis of the wheel.

21. The system of claim 20, wherein the single inductor circuitry is disposed on the non-rotating chassis such that the single inductor axis makes a non-zero angle with respect to a vertical direction.

* * * * *